US012711184B2

(12) United States Patent
Ho et al.

(10) Patent No.: US 12,711,184 B2
(45) Date of Patent: Aug. 18, 2026

(54) ENSEMBLE AUGMENTATION WITH ENHANCED KNOWLEDGE EXTRACTION TECHNIQUES

(71) Applicant: Salesforce, Inc., San Francisco, CA (US)

(72) Inventors: Ricky Ho, San Francisco, CA (US); Frank Wang, San Francisco, CA (US); Lik Mui, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 19/079,190

(22) Filed: Mar. 13, 2025

(65) Prior Publication Data

US 2025/0291854 A1 Sep. 18, 2025

Related U.S. Application Data

(60) Provisional application No. 63/565,453, filed on Mar. 14, 2024.

(51) Int. Cl.
*G06F 16/93* (2019.01)
*G06N 3/042* (2023.01)

(52) U.S. Cl.
CPC ............. *G06F 16/93* (2019.01); *G06N 3/042* (2023.01)

(58) Field of Classification Search
CPC ......... G06F 16/93; G06N 3/042; G06N 5/022
See application file for complete search history.

(56) References Cited

U.S. PATENT DOCUMENTS

2020/0380385 A1* 12/2020 Li .......................... G06N 20/00
2022/0067030 A1* 3/2022 Jiao ...................... G06N 3/0455
2024/0311348 A1* 9/2024 Lutz ...................... G06F 16/258
(Continued)

OTHER PUBLICATIONS

Félix Martel and Amal Zouaq. 2021. Taxonomy extraction using knowledge graph embeddings and hierarchical clustering. In Proceedings of the 36th Annual ACM Symposium on Applied Computing (SAC '21). Association for Computing Machinery, New York, NY, USA, 836-844. (Year: 2021).*
(Continued)

*Primary Examiner* — Kris E Mackes
(74) *Attorney, Agent, or Firm* — Holland & Hart, LLP

(57) ABSTRACT

Methods, systems, apparatuses, devices, and computer program products are described. A system may obtain a set of documents associated with a knowledge base for retrieval-augmented generation (RAG). The system may generate multiple representations of the information included in the documents using multiple knowledge extraction pipelines. For example, the system may generate a set of metadata-based vector embeddings based on the documents, a set of knowledge graphs based on the documents, and a set of hierarchical tree representations based on the documents. The system may receive a user query and may retrieve contextual information from the set of vector embeddings, the set of knowledge graphs, and the set of hierarchical tree representations to augment the user query for a large language model (LLM) prompt. The system may input the prompt to the LLM, and the LLM may output a response based on the user query and the contextual information.

20 Claims, 10 Drawing Sheets

(56) References Cited

U.S. PATENT DOCUMENTS

2024/0386015 A1* 11/2024 Crabtree ............. G06F 16/9024

OTHER PUBLICATIONS

Zhao Zhang, Fuzhen Zhuang, Meng Qu, Fen Lin, and Qing He. 2018. Knowledge Graph Embedding with Hierarchical Relation Structure. In Proceedings of the 2018 Conference on Empirical Methods in Natural Language Processing, pp. 3198-3207, Brussels, Belgium. Association for Computational Linguistics. (Year: 2018).*

Gao et al., "Retrieval-Augmented Generation for Large Language Models: A Survey", arXiv.org, Mar. 1, 2024, XP093284034.

ISA/US, "International Search Report and Written Opinion of the International Searching Authority," issued in connection with Int'l Appl. No. PCT/US25/19953, dated Jun. 23, 2025 (8 pages).

Sarthi et al., "RAPTOR: Recursive Abstractive Processing for Tree-Organized Retrieval", Jan. 31, 2024, XP093284046.

* cited by examiner

ENSEMBLE AUGMENTATION WITH ENHANCED KNOWLEDGE EXTRACTION TECHNIQUES

CROSS REFERENCE

The present application for patent claims priority to and the benefit of U.S. Provisional Patent Application No. 63/565,453 by Ho et al., entitled "ENSEMBLE AUGMENTATION WITH ENHANCED KNOWLEDGE EXTRACTION TECHNIQUES," filed Mar. 14, 2024, assigned to the assignee hereof, and expressly incorporated by reference in its entirety herein.

FIELD OF TECHNOLOGY

The present disclosure relates generally to database systems and data processing and more specifically to ensemble augmentation with enhanced knowledge extraction techniques.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

DETAILED DESCRIPTION

Figure 1:
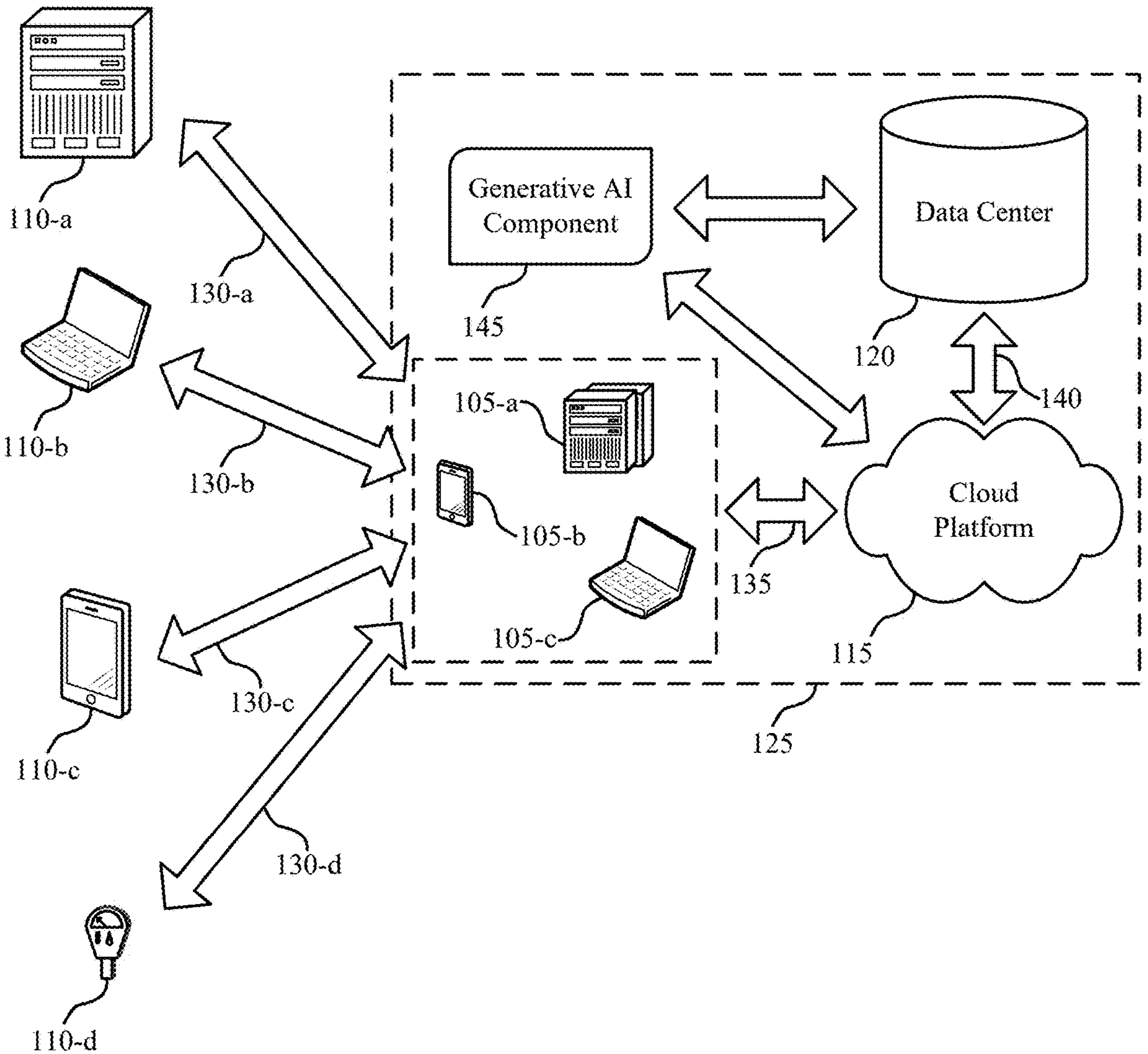
FIG. 1 illustrates an example of a system for data processing that supports ensemble augmentation with enhanced knowledge extraction techniques in accordance with aspects of the present disclosure.

Question and Answer (QA) systems, such as those that leverage large language models (LLMs), are designed to provide accurate and relevant responses to user queries, often leveraging complex algorithms and vast databases of information. However, in some cases, these systems may fail to identify accurate and relevant information or determine the true intent behind user queries. Such difficulties may result in responses that are inaccurate, not fully satisfying to the user, or both. Developing a QA system that can effectively handle complex or ambiguous queries, accurately identify relevant information, and generate responses that are both accurate and satisfying to a user may improve the efficiency of the QA system. Further, some information retrieval techniques may fail to retrieve and synthesize relevant knowledge efficiently, for example, for tasks involving multi-step reasoning, understanding of concepts that span lengthy documents or across multiple documents, or both.

Techniques described herein support information retrieval and knowledge integration that combines multiple knowledge extraction pipelines to improve LLM functionality for a QA system. For example, the QA system may store data that defines a knowledge base for the LLM by embedding vectors enhanced with metadata into a vector space, generating knowledge graphs (e.g., extracted by another LLM) that represent connections between entities, and generating recursive hierarchical trees that represent data summaries with varying levels of detail (e.g., at different depths of the tree structures). By leveraging multiple knowledge extraction techniques, the QA system may improve the efficiency and efficacy of retrieving, summarizing, and integrating complex contextual information from vast data corpora to improve LLM prompts. Such LLM prompts may support multi-step reasoning and understanding of concepts that span relatively lengthy documents or across multiple documents to accurately answer user queries.

The QA system may include an information, or knowledge, extraction pipeline that formats information for efficient retrieval to support retrieval-augmented generation (RAG) techniques. The information extraction pipeline may determine metadata-enhanced vector embeddings based on an input corpora (e.g., a set of documents defining a knowledge base for a specific LLM, organization, or user). These vectors may incorporate rich metadata derived from various sources to improve the relevance of the vector mappings within a vector space. In some examples, the metadata may summarize text chunks, indicate extracted entities, leverage additional metadata associated with the input corpora, or any combination thereof. Additionally, the information extraction pipeline may generate knowledge graphs by extracting information from the input corpora (e.g., using one or more LLMs), which may represent relationships between different entities identified in the input corpora using knowledge graph triplets. A knowledge graph triplet may be an example of a data object or unit of information that includes three elements: a subject (or head) element, a predicate (or relation) element, and an object (or tail) element. In some examples, the knowledge graph may store the triplets as nodes, edges, properties, or a combination thereof in a virtual graph structure. The knowledge graphs may enable the QA system to retrieve relevant information across multiple documents, even if the information is not explicitly stated in contiguous chunks, facilitating "multi-hop" retrieval of contextual information for complex queries. Furthermore, the information extraction pipeline may generate recursive hierarchical trees using recursive embedding, clustering, and summarization of text chunks, constructing a hierarchical tree with different levels of detail at different depths of the tree structure. The structure of the recursive hierarchical trees may enable the QA system to efficiently retrieve information relevant to broad concepts spanning a large corpus (e.g., relatively near a root of a hierarchical tree structure) or to efficiently retrieve more detailed information (e.g., further down the branches of the hierarchical tree structure).

The QA system may generate the vector embeddings, knowledge graph triplets, hierarchical trees, or any combination thereof for a set of documents using batch processing, as background operations, or otherwise implementing efficient processing to ensure the pipelines for encoding the knowledge base maintain processing resource availability for other operations. In some examples, the system may update the vector embeddings, the knowledge graph triplets, the hierarchical trees, or any combination thereof in near-realtime or using batch processing as new or updated documents are added to the knowledge base. The techniques described herein may significantly improve the efficiency and effectiveness of retrieving, summarizing, and integrating complex information from vast data corpora, especially for QA tasks that involve multi-step reasoning and understanding of concepts that span across multiple documents.

The techniques described herein support user query augmentation to "ground" a query to a knowledge base using the multiple different representations of the knowledge base. For example, "grounding" a query to a knowledge base (e.g., a database, a data source, an aggregation of documents or other information relevant to a system, organization, or topic) may involve determining data objects, documents, portions of documents, or other relevant information stored for the knowledge base that are associated with the user query. The techniques described herein leverage the three pipelines that encode the knowledge base for use in prompt (e.g., query) augmentation. By implementing multiple (e.g., three) pipelines, the system may use the same data to generate multiple different types of embeddings or encodings that support prompt augmentation. When a user query is received at the QA system, the system may identify a set of vectors, from the vector embeddings, that are similar to—or otherwise associated with—the user query (e.g., using one or more vector similarity techniques), a set of knowledge graph triplets (which may be vectorized) that are similar to or otherwise associated with—the user query, a set of nodes from one or more recursive hierarchical trees that are similar to—or otherwise associated with—the user query, or any combination thereof. The system may use the set of vectors, the set of knowledge graph triplets, the nodes from the hierarchical trees, or a combination thereof to augment the user query and may input the augmented user query (or one or more values representing the augmented user query) into an LLM. Thus, the three pipelines are ensembled (e.g., the results of the pipelines are combined or otherwise aggregated) and used to augment a user query with knowledge base-specific information. The LLM may output a relatively more accurate answer to the query based on the additional contextual information provided by the augmentation. In some examples, the multiple pipelines may combine multiple machine learning models to obtain better predictive performance than could be obtained from any of the constituent models. The LLM's accuracy is enhanced as it is grounded by the knowledge graph, the vector embeddings (e.g., word embeddings or other generated vectors), and the recursive hierarchical trees. The techniques described herein for query augmentation may support efficient processing of queries by grounding them in a knowledge base, thereby enhancing the accuracy of the LLM and the QA system. The LLM may process relatively fewer queries in order to provide an accurate and satisfying response to a user, reducing the processing overhead associated with running the LLM and outputting results. These and other techniques are described in further detail with respect to the figures.

Aspects of the disclosure are initially described in the context of a data processing system. Aspects of the disclosure are further described with respect to architecture diagrams that support pipelines for encoding documents for query augmentation and a query augmentation process. Aspects of the disclosure are further illustrated by and described with reference to process flows, apparatus diagrams, system diagrams, and flowcharts that relate to ensemble augmentation with enhanced knowledge extraction techniques.

FIG. 1 illustrates an example of a system 100 for data processing that supports ensemble augmentation with enhanced knowledge extraction techniques in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-toconsumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

In some examples, the system 100 may include a generative artificial intelligence (AI) component 145. The generative AI component 145 may be an example or a component of an LLM, such as a generative AI model. In some examples, the generative AI component 145 may additionally, or alternatively, be referred to as any of an AI, a generative AI (GAI), a GAI model, an LLM, a machine learning model, or any similar terminology. The generative AI component 145 may be a model that is trained on a corpus of input data, which may include text, images, video, audio, structured data, or any combination thereof. Such data may represent general-purpose data, domain-specific data, or any combination thereof. Further, the generative AI component 145 may be supplemented with additional training on data associated with a role, function, or generation outcome to further specialize the generative AI component 145 and increase the accuracy and relevance of information generated with the generative AI component 145.

In some examples, the cloud platform 115 may receive a query from a cloud client 105 that may include a request to produce a response (e.g., text, images, video, audio, or other information) to the query using the generative AI component 145. The cloud platform 115 may input a prompt to the generative AI component 145 that includes, or otherwise indicates, the query (or information included therein). The generative AI component 145 may generate an output (e.g., text, images, video, audio, or other information) that is responsive to the prompt. In some examples, the cloud platform 115 may modify or supplement one or more aspects of the query to increase the quality of the response. In some examples, such modification or supplementation may be referred to as grounding.

The system 100 may support any configuration for the use of generative AI models. In FIG. 1, the generative AI component 145 is depicted as being located internal to the subsystem 125. However, the generative AI component 145 may be hosted on the cloud platform 115, elsewhere within the subsystem 125, or outside the subsystem 125 (e.g., a publicly-hosted platform). Additionally, or alternatively, multiple generative AI components 145 may be employed to perform one or more of the actions described as being performed by a single generative AI component 145. Further, in some examples, the generative AI component 145 may communicate with one or more other elements, such as a contact 110, the data center 120, one or more other elements, or any combination thereof, to receive additional information (e.g., that may be indicated in the query or the prompt) that is to be considered for performing generative processes.

In various implementations, the models and/or modules described herein (e.g., including, but not limited to, the generative AI component 145) may be classification, predictive, generative, conversational, or another form of AI technology, such as AI model(s), agents, etc., implementing one or more forms of machine learning, a neural network, statistical modeling, deep learning, automation, natural language processing, or other similar technology. The AI technology may be included as part of a network or system comprising a hardware- or software-based framework for training, processing, fine-tuning, or performing any other implementation steps. Furthermore, the AI technology may include a hardware- or software-based framework that performs one or more functions, such as retrieving, generating, accessing, transmitting, etc. The AI technology may be implemented by a computer including a register coupled with a processor or a central processing unit (CPU).

Moreover, the AI technology may be trained or fine-tuned using supervised, unsupervised, or other AI training techniques. In various implementations, the AI technology may be trained or fine-tuned using a set of general datasets or a set of datasets directed to a particular field or task. Additionally, or alternatively, the AI technology may be intermittently updated at a set interval or in real time based on resulting output or additional data to further train the AI technology. The AI technology may offer a variety of capabilities including text, audio, image, and other content generation, translation, summarization, classification, prediction, recommendation, time-series forecasting, searching, matching, pairing, and more. These capabilities may be provided in the form of output produced by the AI technology in response to a particular prompt or other input. Furthermore, the AI technology may implement RAG or other techniques after training or fine-tuning by accessing a set of documents or knowledge base directed to a particular field or website other than the training or fine-tuning data to influence the AI technology's output with the set of documents or knowledge base.

To further guide and train output of the AI technology, one or more input prompts may be provided to the AI technology for the purpose of eliciting particular responses. In various implementations, the input prompts may correspond to the particular field or task to which the AI technology is trained. Additionally, or alternatively, the AI technology may be implemented along with one or more additional AI technologies. For example, a first AI model may produce a first output, which is used as input for a second AI model to produce a second output. These AI technologies may be used in succession of one another, in parallel with one another, or a combination of both. Furthermore, the AI technologies may be merged in a variety of implementations, for example, by bagging, boosting, stacking, etc. the AI technologies.

The cloud platform 115, the subsystem 125, or both may support various services for contact 110 and/or cloud client 105 interaction. For example, the cloud platform 115 may support a customer service chat bot (e.g., an example or component of a QA system) that a cloud client 105 may implement or leverage to support interactions 130 with the contacts 110. In some examples, these chat bots may leverage generative AI (e.g., the generative AI component 145) and/or LLM techniques to support these interactions. Such systems may be designed to provide accurate and relevant responses to user queries, often leveraging complex algorithms and vast databases of information (e.g., stored at a data center 120 or other data management system or service). However, a persistent challenge for such systems is the ability to handle complex or ambiguous queries effectively. Other QA systems may struggle to identify the relevant information or understand the true intent behind user queries. This difficulty may result in responses that are inaccurate, not fully satisfying to the user, or both. Some systems may implement RAG techniques to attempt to improve the accuracy of query responses. However, RAG processes may retrieve documents that are not relevant for the current user query based on a limited or incomplete understanding of the document contents. For example, the RAG processes may retrieve documents that use similar words as the query but may fail to determine how these words correspond to underlying data objects in a database, relationships between data objects or entities, or other important connections. Accordingly, such systems may inefficiently search for relevant documents that fail to provide the proper context for an LLM, increasing a processing overhead of the QA system without improving an accuracy of the answers provided by the QA system. In contrast, developing a QA system that can effectively handle complex or ambiguous queries, accurately identify relevant information, and generate responses that are both accurate and satisfying to a user may improve the efficacy and efficiency of the QA system.

Techniques described herein support query "ensemble" augmentation using multiple different types of information encodings based on multiple knowledge extraction pipelines. The multiple knowledge extraction pipelines may embed vectors with enhanced metadata in a vector space, generate knowledge graphs including knowledge graph triplets, and generate recursive hierarchical trees that store summaries with different levels of detail at different depths of the trees. Each of these different formats for storing data representations may store contextual information relating to a same knowledge base (e.g., a same set of documents or document chunks defining the knowledge base). When a query is received by the system 100, these different formats representing the knowledge base may be leveraged to augment the query. For example, the system 100 may assemble (e.g., aggregate or combine) contextual information retrieved from these different formats into an ensemble of contextual information based on the user query and may input the ensembled contextual information into an LLM. By using different types of encodings of information (e.g., vector embeddings and knowledge graph triplets), the system 100 may improve the query augmentation process and provide more accurate context with the user query as inputs to the LLM. The output provided by the LLM in response to the augmented query may be provided to the user. The multiple pipeline structure for encoding information may improve the accuracy and efficiency of the LLM, reducing a processing overhead associated with the system 100 providing an answer to a user query. For example, improving query augmentation may reduce a quantity of queries to be processed (or a quantity of queries that are updated to clarify a question) at the LLM, reducing a processing overhead associated with running the QA system.

It should be appreciated by a person skilled in the art that one or more aspects of the disclosure may be implemented in a system 100 to additionally, or alternatively, solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In an example use case, the system 100 hosting a QA system may be associated with one or more organizations, such as the Commonwealth Bank of Australia (CBA). For example, the CBA may store data at the data center 120, may be a tenant or a client of a tenant of a multi-tenant database system supported by the system 100, or both. The system 100 may receive a query from a user via a user device (e.g., a cloud client 105 or a contact 110). The query may be an example of a natural language query posing a question to the QA system. In some cases, the question may correspond to an organization associated with the system 100, such as the Commonwealth Bank of Australia. For example, the query may ask "In how many ways does the CBA help large private organizations?"

Some other QA systems may fail to correctly determine the meaning of this question based on the ambiguous acronym "CBA." For example, other QA systems may create answers without context (e.g., without the aid of additional contextual information). In some cases, these answers may be unrelated to the Commonwealth Bank of Australia. For example, a first QA system may output an answer relating to "Cost-Benefit Analysis," while a second QA system may output an answer relating to a "Community Benefits Agreement" based on incorrect interpretations of the acronym "CBA." Accordingly, these QA systems may fail to understand the true intent behind the question, resulting in inaccurate answers. To obtain an accurate answer from these QA systems, a user may input one or more additional queries providing further details to help the QA systems correctly determine the intent of the question. Accordingly, such QA systems may process multiple queries in order to output an accurate answer, resulting in significant processing overhead and increased latency associated with the QA systems determining an accurate response to a query.

Further, some other QA systems that use RAG techniques may fail to provide a complete answer to the question. For example, a QA system may use a simple semantic vector-based RAG process to retrieve contextual information to use with the question (e.g., as inputs to an LLM). The QA system may retrieve grounding information from the Commonwealth Bank of Australia's website to include with the question as inputs to the LLM. As an example, the LLM may output the following response: "CBA helps large private organizations in three ways: by absorbing correspondent bank fees for international money transfers, supporting investments in private equity transactions like KKR's investment in Ritchies Transport, and providing sustainable finance solutions such as the Reliance Rail GSLL." This response may partially answer the question but may not be fully satisfying to the user. Additionally, the RAG process may fail to effectively utilize all of the information (e.g., structured data, unstructured data, documents) available to the LLM. For example, the RAG process may fail to determine relevant information that is based on metadata, that corresponds to named entities (e.g., in the data center 120 or other named entities), that is split across multiple documents, or any combination thereof. Accordingly, for the same set of information, the semantic vector-based RAG process may identify a limited amount of contextual information for the LLM.

In contrast, the system 100 may host a QA system that uses multiple pipelines to support RAG operations. For example, the QA system may support a metadata-based vector pipeline that generates vectors representing a set of relevant documents (e.g., including the Commonwealth Bank of Australia's website), a graph pipeline that generates a graph of knowledge triplets representing the set of relevant documents, and a recursive abstractive processing for tree-organize retrieval (RAPTOR) pipeline that generates hierarchical tree structures representing the set of relevant documents. These different pipelines may represent the information included in the set of relevant documents in different ways. Additionally, or alternatively, the QA system may use real-time query reformation techniques, context expansion techniques, or both to further improve the QA system. The system 100 may receive the question "In how many ways does the CBA help large private organizations?" and may retrieve relevant information (e.g., using a RAG process) using the representations from one or more of the pipelines (e.g., in an ensemble of information aggregated across the pipelines). Because the information is represented in multiple different ways, the system 100 may identify more accurate information, more detailed information, or both as compared to other RAG systems (e.g., semantic vector-based RAG). The system 100 may input, to an LLM (e.g., the generative AI component 145), indications of the question and the retrieved relevant information. The LLM may output, based on the question and the contextual information (e.g., the retrieved relevant information), an answer that satisfies the user. As an example, the LLM may output the following response:

"The CBA helps large private organizations in three main ways:

1. Providing bespoke solutions that meet complex needs: The CBA offers a full range of financial markets capabilities, capital raising solutions, transaction banking services, and risk management products and services tailored to the specific needs of each organization. This includes customized financial solutions to address unique challenges and opportunities faced by large private organizations.

2. Building deep relationships with large private and public sector organizations: The CBA focuses on developing strong and long-lasting relationships with its clients to better understand their needs and deliver tailored solutions. By working closely with both private and public sector organizations, the CBA can provide comprehensive financial services that align with their strategic goals and objectives.

3. Connecting international clients to opportunities: With offices in Europe, the US, and Asia Pacific, the CBA serves as a bridge for international clients looking to access opportunities in Australia and beyond. By leveraging its global network and expertise, the CBA helps international organizations navigate the Australian market and identify potential investment opportunities.

Specific services offered by the CBA to large private organizations include: Financial markets capabilities: The CBA provides access to a wide range of financial products and services, including foreign exchange, fixed income, and derivatives, to help organizations manage their investment portfolios and mitigate risks. Capital raising solutions: The CBA assists organizations in raising capital through debt and equity financing, initial public offerings (IPOs), and other fundraising activities to support their growth and expansion plans. Transaction banking services: The CBA offers a suite of transaction banking services, such as cash management, trade finance, and treasury solutions, to streamline financial operations and optimize liquidity management for large private organizations. Risk management products and services: The CBA helps organizations identify, assess, and mitigate various financial risks, including market risk, credit risk, and operational risk, through customized risk management solutions tailored to their specific needs and risk tolerance.

By providing these comprehensive services and fostering strong relationships with clients, the CBA plays a crucial role in supporting the growth and success of large private organizations in today's complex and interconnected global economy.

Do you have any specific requirements or additional questions about the services offered by the CBA to large private organizations?"

By augmenting the question with an ensemble of information from multiple different knowledge-extraction pipelines, the system 100 may improve RAG functionality. For example, the different pipelines may store the relevant information in different formats or structures, where one format or structure may be relatively more accurate or detailed than another format or structure for a specific question. The RAG process may retrieve information from each of the pipelines and weight the information, such that the system 100 provides the LLM with accurate and detailed information from across the knowledge-extraction pipelines for any question.

Figure 2:
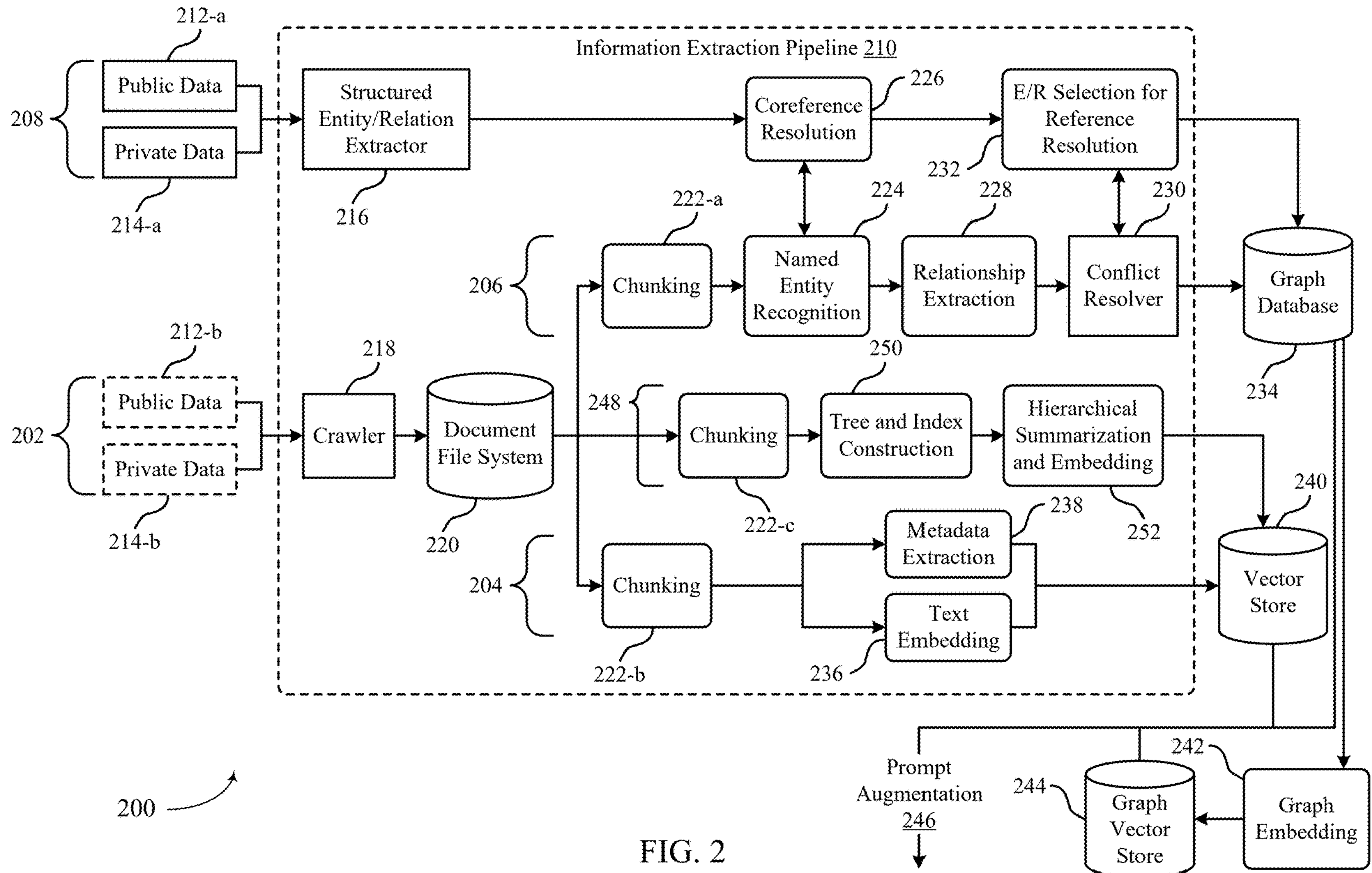
FIG. 2 shows an example of a computing architecture that supports ensemble augmentation with enhanced knowledge extraction techniques in accordance with aspects of the present disclosure.

FIG. 2 shows an example of a computing architecture 200 that supports ensemble augmentation with enhanced knowledge extraction techniques in accordance with aspects of the present disclosure. The computing architecture 200 includes various components for information extraction to support prompt augmentation. The computing architecture 200 may represent at least a portion of a computer architecture that supports a QA system as described herein. The computing architecture 200 may support multiple knowledge-extraction pipelines for encoding information in different forms to support query augmentation (e.g., LLM prompt augmentation). A processing device or system, such as a server, worker server, application server, database server, server cluster, user device, cloud-based service, container, virtual server, or any combination thereof may provide the computing architecture 200.

At 202, the system may receive, retrieve, identify, or otherwise obtain unstructured data (e.g., a set of documents) associated with a knowledge base (e.g., a specific topic, data type or database schema, or goal of the QA system). The unstructured data may include websites, Really Simple Syndication (RSS) feeds, call logs, slack channel feeds, emails, text messages, chat messages, previous queries, technical documents, scientific papers, studies, or any other information. In some cases, a crawler 218 may obtain the unstructured data (e.g., scraping websites or otherwise identifying the data associated with the knowledge base), and the data may be stored in a document file system 220. The unstructured data may include public data 212-*b*, private data 214-*b*, or both.

The unstructured data may be processed by multiple pipelines (e.g., three knowledge-extraction pipelines within an information extraction pipeline 210 for vector generation). A metadata-based vector pipeline 204 (e.g., a first data pipeline) may perform chunking 222-*b*, text embedding 236, and metadata extraction 238 on the unstructured data. The chunking 222-*b* may involve determining discrete portions of text from the unstructured data (e.g., the documents) for the text embedding 236, the metadata extraction 238, or both. In some examples, the chunking 222-*b* may use delimiters, such as periods, line breaks, page breaks, white space, or other logical or implicit delimiters, to separate the unstructured data into distinct chunks (e.g., portions) for processing. The text embedding 236 may embed each chunk of data into a vector space (e.g., an N-dimensional vector space, where N may be any integer value). The text embedding 236 may use any vectorization or embedding technique (e.g., word embedding, phrase embedding) to generate a vector that corresponds to a data chunk. For example, the text embedding 236 may generate an array of values representative of a vector in a vector space that indicates the contents of the data chunk.

Additionally, or alternatively, the metadata extraction 238 may involve determining metadata associated with each chunk of data. Metadata extraction 238 may involve extraction of keywords, summaries, authors, publication dates, or other information associated with a document or specific data chunk from the document. The metadata-based vector pipeline 204 may use the extracted metadata to enhance the vectors generated based on the substance of the documents. Metadata extraction 238 and vector augmentation based on the metadata is illustrated by, and described in further detail with respect to, FIG. 4. For example, the metadata-based vector pipeline 204 may go beyond simple keyword-based retrieval by incorporating rich metadata derived from various sources. This includes summarizing retrieved text chunks, extracting entities, and leveraging additional metadata associated with the text chunks. The metadata-based vector pipeline 204 may store the resulting vectors (in some examples, with corresponding metadata or augmented by the corresponding metadata) in a vector store 240.

Embedded vectors combined with metadata may support improved information retrieval and understanding. In some cases, the vector store 240 may store embedded vectors representing structured data, unstructured data, or both. The embedded vectors generated via the metadata-based vector pipeline 204 may support search and recommendation systems. For example, including the metadata, such as tags, categories, user preferences, or some combination thereof, with the vector embeddings may improve search results within the vector space. Additionally, or alternatively, the embedded vectors may support content personalization by tailoring content recommendations (e.g., RAG document or information retrieval) based on user profiles, user preferences, context, or some combination thereof. Additionally, or alternatively, the embedded vectors may support natural language understanding (e.g., semantic understanding) by combining vector representations with additional metadata-based context. The metadata-based vector pipeline 204 may improve flexibility, interpretability, fine-grained filtering, or any combination thereof for RAG techniques. For example, the extracted metadata may provide context and additional information that enhances the richness of vector embeddings and may support tracing of information back to a source for improved validation and reliability. Metadata filters may allow a user or the system to refine retrieval results based on specific criteria. As an example, a movie recommendation system may combine movie embeddings with metadata (e.g., indicating genre, release year, director, or other information about the movies) to improve the accuracy and personalized recommendations by the movie recommendation system.

A graph pipeline 206 (e.g., a second data pipeline) may perform chunking 222-*a*, named entity recognition (NER) 224 (in some examples, with coreference resolution 226), relationship extraction 228, confliction resolution (e.g., via a conflict resolver 230), and knowledge graph generation based on the unstructured data (e.g., the set of documents from the document file system 220). In some examples, the computing architecture 200 may perform a single chunking operation, where the resulting chunks of data are sent through multiple pipelines. In some other examples, different pipelines may perform chunking separately, which may possibly result in different chunks of data (e.g., of different sizes, with different delimiters, with different information) being processed via the different pipelines. NER 224 may involve determining one or more named entities within each chunk of data. For example, a named entity may be a user, an identifier, a data object (e.g., a data object stored in a database, such as a multi-tenant database), a specific parameter or value, or any other identifiable entity that is associated with additional contextual meaning (e.g., beyond the definition of the word or words themselves). Coreference resolution 226 may involve resolving entity conflicts or vagueness within a document. For example, if a document states, "John ate cereal this morning" and "He then rode the bus," coreference resolution 226 may involve replacing "He" with "John" in a corresponding knowledge graph triplet. A named entity may be assigned as a subject element for a knowledge graph triplet, an object element of a knowledge graph triplet, or both (e.g., for different triplets). Relationship extraction 228 may determine one or more relationships between identified named entities, for example, based on interaction data (e.g., product purchases, interaction with other subjects) from the documents and/or other structured or unstructured data accessible by the system. A relationship may be assigned as a relationship or predicate element for a knowledge graph triplet, defining the correlation between the subject element and the object element of the knowledge graph triplet. A conflict resolver 230 may resolve conflicts between knowledge graph triplets determined from the unstructured data and knowledge graph triplets determined from structured data. For example, if the conflict resolver 230 determines that a relationship identified from the unstructured data conflicts with a relationship defined in the structured data, the conflict resolver 230 may update or remove the corresponding knowledge graph triplet determined from the unstructured data (e.g., as an anomaly or improper knowledge). The resulting knowledge graph triplets (e.g., subject element, relationship or predicate element, object element) may be stored in a graph database 234. In some examples, the subject elements may be stored as nodes in a graph (e.g., a knowledge graph), the object elements may indicate edges between a node representing a subject element and a node representing a corresponding object element, and the relationship elements may indicate weighting of the edges in the graph between the subject elements and the object elements.

Additionally, or alternatively, the knowledge graphs (e.g., formed by a set of knowledge graph triplets at the graph database 234) may be processed to generate vectors and graph embeddings. For example, the computing architecture 200 may perform graph embedding 242 to embed the graph in a vector space (e.g., a vector space defined within a graph vector store 244). The graph embedding 242 may convert the nodes and edges of the graph (e.g., the knowledge graph triplets) into vectors within the vector space, where distances between different vectors may indicate relationships between different named entities or other parameters. The graph pipeline 206 may leverage the capabilities of LLMs to precisely extract entity-specific information from knowledge graphs. This may enable a QA system to retrieve relevant information from across multiple documents, even if the information is not explicitly stated in contiguous chunks, facilitating "multi-hop" retrieval (e.g., "hopping" from one document to the next to retrieve relevant information) for complex queries.

In some cases, the information or entities in the knowledge graphs may be associated with respective timestamps which define the relevancy, liveness, and/or staleness of data. That is, a timestamp may indicate when the corresponding data was collected or identified and/or when the data is to expire. These timestamps may be used by a query and response system to identify relevant data for query augmentation. Thus, if the timestamp indicates that the data is stale, then the corresponding data (e.g., element of a knowledge graph triplet and/or data of a vector) may not be used to augment the user query. Other types of techniques for encoding time with respect to data may be used within the context of the present disclosure. For example, time to live and or age may also be encoded or used in association with graph or vector data. In some cases, the timestamp information may be identified via the metadata extraction 238.

The knowledge graphs may represent information in a network of interlinked entities that provide structured and semantic context to the information. A knowledge graph stored at the graph database 234 or the graph vector store 244 may support question answering, semantic searches, provenance tracking, or any combination thereof. For example, an LLM may retrieve relevant information from a knowledge graph to answer a complex question, where the LLM may use the knowledge graph to improve the accuracy and contextual awareness of search results. Knowledge graphs may also trace back information to a corresponding original source. By supporting a structured representation (e.g., as compared to a vector space), a knowledge graph may organize information for more efficient navigation and searching. The LLM may access "long-tail" knowledge (e.g., data that is relatively rare within the set of documents or spread across multiple documents) effectively and efficiently from the knowledge graph. As an example, an LLM-based chatbot may use a knowledge graph generated by the graph pipeline 206 to support domain-specific queries.

A RAPTOR pipeline 248 (e.g., a third data pipeline) may perform chunking 222-*c*, tree and index construction 250, and hierarchical summarization and embedding 252 based on the unstructured data (e.g., the set of documents from the document file system 220). The chunking 222-*c* may be a shared chunking process with one or more other data pipelines or may be a chunking process specific to the RAPTOR pipeline 248. The RAPTOR pipeline 248 may use recursive embedding to generate hierarchical tree structures based on one or more documents, one or more document chunks, or both. A hierarchical tree structure may support context-aware and efficient retrieval of information across a large corpora of data (e.g., from a single document or across multiple documents). In some examples, the system may store the result of the RAPTOR pipeline 248, which may include hierarchical summarizations and embeddings, in the vector store 240 (e.g., as one or more vectors in vector space).

A hierarchical tree may summarize and cluster chunks of text recursively, creating a hierarchical structure for relatively more efficient retrieval. Each node of the hierarchical tree may represent a data element (e.g., a specific summary of an aspect of a data chunk). The tree structure may include a root node that is connected to one or more child nodes (e.g., via branches or edges). Each child node may include zero or more further child nodes. A child node with no further child nodes may be referred to as a leaf node. The RAPTOR pipeline 248 may organize data that is relatively broader near the root of the tree and data that is relatively more detailed near the leaves of the tree, creating a hierarchical structure to the tree. The hierarchical structure may enable RAG to retrieve different levels of detail based on different depths through the hierarchical tree structure, supporting variable levels of complexity. For example, the hierarchical tree may support complex question answering using recursive summaries that improve reasoning and accuracy for multi-part questions. The hierarchical tree may also support relatively long document understanding by integrating information across lengthy documents at different levels of abstraction (e.g., different levels of detail at different depths within the tree structure). The hierarchical tree may provide holistic context via the recursive summaries that enable an LLM to understand broad context across entire documents (e.g., using summaries near the root node of the tree). The hierarchical tree may also support fine-grained retrieval by enabling RAG to retrieve relevant information at different levels of summarization (e.g., at different depths along branches of the tree). The hierarchical tree may improve LLM-based question answering based on the recursive summaries and efficient searching supported by the hierarchical tree structure.

At 208, a structured data pipeline may also process structured data to further support the techniques described herein. The structured data may include public data 212-*a*, such as data from LinkedIn or other publicly available structured data, and private data 214-*a* (e.g., data cloud and/or organization/entity data), such as data from private databases or tenant-specific data storage. The structured data may be obtained and processed to extract named entities and relationships from the structured data using a structured entity/relation extractor 216. This data may be used to support the graph pipeline 206 for unstructured data, for example, by resolving conflicts in the data (e.g., conflicts between the structured data and the unstructured data). The structured data pipeline may resolve conflicts in the data (e.g., via the conflict resolver 230, a process for entity/relationship selection for reference resolution 232, or both), create additional knowledge graph triplets (e.g., ground truth triplets) in the graph database 234, or both. This data may be used to support generation of graph embeddings based on relationships (e.g., interactions) between entities. The graph embeddings may be stored in the graph vector store 244. Thus, various data stores with different vector embeddings (and knowledge graphs and hierarchical tree representations) based on input data may be generated. Additionally, such data may be used for prompt augmentation 246 as described herein with respect to FIG. 3.

The computing architecture 200 may support multiple different techniques for representing a knowledge base based on the multiple pipelines. A RAG process may retrieve contextual information from one or more of these representations, improving the scope and the accuracy of the RAG process. A QA system using the multiple pipelines may improve the handling of complex queries. For example, a complex question-answering task may involve understanding the relationship between climate change and marine biodiversity. The QA system may use embedded vectors (e.g., generated via the metadata-based vector pipeline 204) from the vector store 240 to retrieve relevant documents and chunks of text based on keywords like "climate change" and "marine biodiversity." Enhanced metadata determined via metadata extraction 238 may enable the retrieval to be both comprehensive and contextually relevant. Additionally, or alternatively, the QA system may use one or more knowledge graphs (e.g., generated via the graph pipeline 206) from the graph database 234 or the graph vector store 244 to extract and integrate entity-specific information, such as specific species of marine life affected by temperature changes. The graph pipeline 206 may create a multi-hop knowledge graph that spans across documents or document chunks. Such a multi-hop knowledge graph may enable the identification of complex relationships and causations not apparent in isolated documents. Additionally, or alternatively, the QA system may use one or more recursive hierarchical trees (e.g., generated via the RAPTOR pipeline 248) from the vector store 240 or another database to retrieve additional contextual information. The RAPTOR pipeline 248 may organize information into a hierarchical structure that synthesizes the vast amount of data into concise, understandable summaries. Such a hierarchical structure may enable the QA system to extract nuanced insights into how climate change impacts marine ecosystems at various levels, from individual species to entire habitats. Accordingly, the three knowledge-extraction pipelines may use different and complementary techniques that each support improved RAG for specific types of user queries, providing different retrieval capabilities that complement each other. By using the three knowledge-extraction pipelines for RAG (e.g., rather than any single pipeline), the computing architecture 200 may provide robust support for a variety of user queries.

Figure 3:
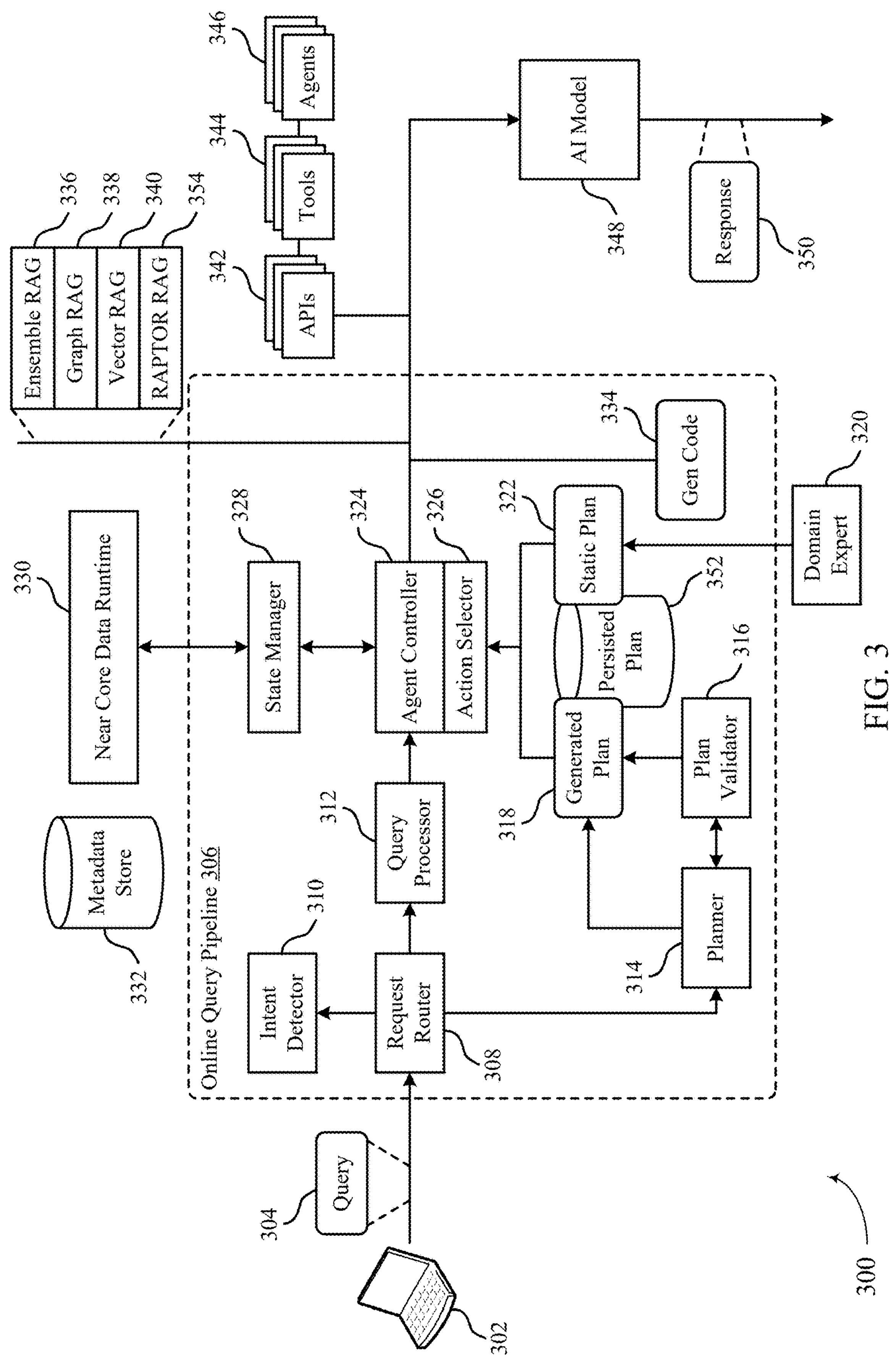
FIG. 3 shows an example of a computing architecture that supports ensemble augmentation with enhanced knowledge extraction techniques in accordance with aspects of the present disclosure.

FIG. 3 shows an example of a computing architecture 300 that supports ensemble augmentation with enhanced knowledge extraction techniques in accordance with aspects of the present disclosure. The computing architecture 300 includes various components to support prompt augmentation. The computing architecture 300 may represent at least a portion of a computer architecture that supports a QA system as described herein. The computer architecture may access the data stores of FIG. 2, such as a graph database 234, a vector store 240, a graph vector store 244, a hierarchical tree store, or a combination thereof, to support input prompt ensemble augmentation. For example, the computer architecture may implement a RAG or similar process to retrieve relevant information from the graph database 234, the vector store 240, the graph vector store 244, the hierarchical tree store (e.g., which, in some cases, may be a component of the vector store 240) or a combination thereof to provide contextual information with a query 304 as a prompt (e.g., an augmented prompt) input to an LLM (e.g., an AI model 348).

When a query 304 (e.g., a user query) is received at the QA system (e.g., via a client interface) described herein, the query 304 may be processed by an online query pipeline 306. In some examples, a user operating a user device 302 may input the query 304 as a question to the QA system (e.g., via a QA interface which may be a mobile interface, an application-specific interface, a chat interface, or any combination thereof). The query 304 may be written in natural language, for example, as a question to a chat bot. Additionally, or alternatively, the query 304 may be an example or a component of a prompt to an LLM, such as the AI model 348.

A request router 308 may receive the query 304 and route the query to one or more components of the online query pipeline 306. For example, the request router 308 may send the query 304 to an intent detector 310. The intent detector 310 may process the query 304 to determine (e.g., predict or otherwise detect) the intent of the query 304, for example, using natural language processing (NLP) techniques or other mechanisms.

Additionally, or alternatively, the request router 308 may send the query 304 to a planner 314. The planner 314 may automatically generate a plan (e.g., a generated plan 318) for handling the query 304. For example, the generated plan 318 may define, or otherwise indicate, a set of actions to perform based on the query 304. The actions may involve interactions with a database, interactions with one or more APIs 342, tools 344, agents 346, or any combination thereof. In some examples, a plan validator 316 may analyze the generated plan 318 and determine whether to modify the generated plan 318 (e.g., to improve database interactions, to ensure supported usage of processing resources, or to otherwise validate that the generated plan 318 is supported by the QA system). In some examples, the QA system may store the generated plan 318 at a persisted plan database 352. A stored plan may be retrieved, analyzed, or reused to improve system efficiency. Additionally, or alternatively, a user (e.g., a domain expert 320) may create a static plan 322 for handling the query 304 or for generically handling a set of possible queries. For example, the static plan 322 may be a custom plan based on the query 304 or a universal plan to support one or more queries or types of queries. In some examples, the QA system may additionally store the static plan 322 at the persisted plan database 352.

Additionally, or alternatively, the request router 308 may send the query 304 to a query processor 312 (e.g., with an indication of the intent of the query 304). The query processor 312 may process the query 304 (e.g., using NLP or similar techniques) and may send the processed query 304 to an agent controller 324. The agent controller 324 may include, or otherwise communicate with, an action selector 326. The action selector 326 may receive a plan (e.g., a generated plan 318, a static plan 322, or both) and determine a set of actions to perform, an order for performing the actions (e.g., including, in some cases, which actions to perform in sequence and which actions to perform in parallel), or both. The QA system may perform the actions based on the query 304, the plan, and the action selector 326.

In some examples, the agent controller 324 may communicate with a state manager 328. The state manager 328 may manage a runtime state 330 for near Core data. In some cases, the runtime state 330 may additionally depend on metadata from a metadata store 332. In some cases, an action indicated by the action selector 326 may modify a state of data or the runtime state 330, for example, based on the state manager 328.

The agent controller 324 may send the processed query 304 for input into the AI model 348, for example, as a component of a prompt (e.g., a large language prompt). In some cases, the online query pipeline 306 may generate code 334 to further process the query 304 or to modify the prompt. In some cases, one or more APIs 342, tools 344, agents 346, or any combination thereof may modify the prompt.

Additionally, or alternatively, the query 304 may be augmented with one or more aspects of the computing architecture 200 of FIG. 2. For example, the online query pipeline 306 may identify document chunks from the vector store 240 of FIG. 2 based on the similarities between the query 304 (e.g., a vectorized version of the query 304) and the vectors of the vector store 240 (e.g., via vector RAG 340). The online query pipeline 306 may additionally, or alternatively, identify knowledge graph triplets (e.g., vectorized or not) that are similar to the user query (e.g., via graph RAG 338). The online query pipeline 306 may additionally, or alternatively, identify graph embeddings that are similar or related to the input query (e.g., via graph RAG 338). The online query pipeline 306 may additionally, or alternatively, identify one or more hierarchical tree representations that are similar or related to the input query (e.g., via RAPTOR RAG 354). Such identified information may be "ensembled" or combined together (e.g., via ensemble RAG 336) and/or with the input query 304 to generate an augmented prompt for the AI model 348. In some cases, the AI model 348 may be a component of a system or service hosting, or otherwise supporting, the QA system. The augmented prompt may be passed to an LLM (e.g., the AI model 348) and the LLM may provide a response 350. For example, the system may input the augmented prompt to the AI model 348 (e.g., as a set of vectors or values indicating the query 304 and the information determined based on the ensemble RAG 336, the graph RAG 338, the vector RAG 340, the RAPTOR RAG 354, or any combination thereof), and the AI model may output, in response to the augmented prompt, the response 350 (e.g., a set of vectors or values indicating the response 350). The response 350 may be an answer to the question posed by the query 304. The QA system may send the response 350 or an indication of the response 350 to a user as an answer (which may or may not be further modified). For example, the QA system may send the response 350 back to the user device 302 in response to the query 304, and the user device 302 may present the response 350 to the user via a user interface. Thus, the augmented prompt may support "grounding" the query 304 to a knowledge base (e.g., the knowledge base represented by vectors, triplets, and trees generated as described with reference to FIG. 2), which may support an improved prompt and more relevant, accurate, and user acceptable results from the LLM (e.g., the AI model 348).

Figure 4:
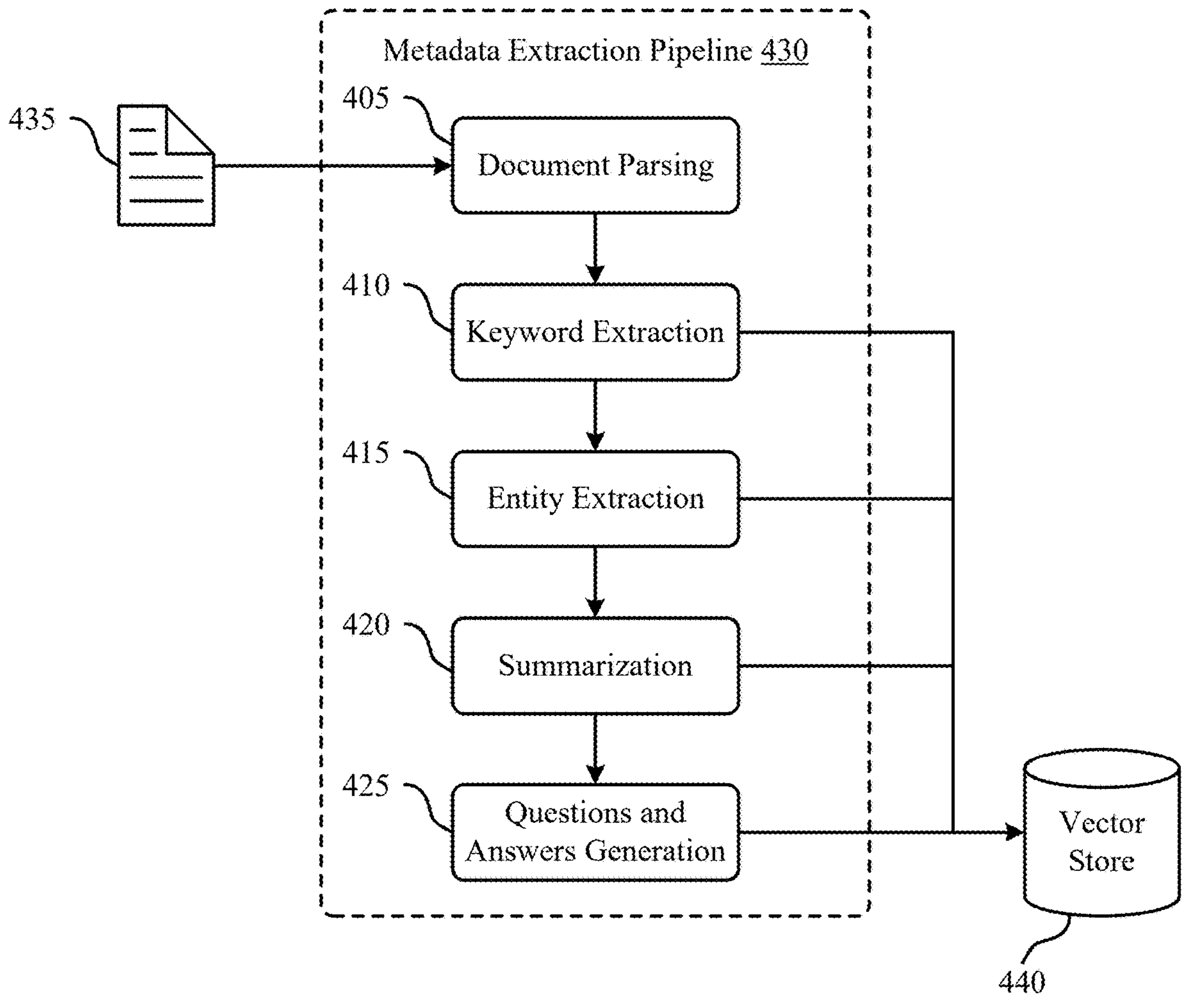
FIG. 4 shows an example of a process flow that supports ensemble augmentation with enhanced knowledge extraction techniques in accordance with aspects of the present disclosure.

FIG. 4 shows an example of a process flow 400 that supports ensemble augmentation with enhanced knowledge extraction techniques in accordance with aspects of the present disclosure. A processing device or system, such as a server, worker server, application server, database server, server cluster, user device, cloud-based service, container, virtual server, or any combination thereof may perform one or more operations of the process flow 400. The process flow 400 may include example operations for extracting metadata associated with text chunks, where the metadata may be used to enhance vector embeddings as described herein. The operations of the process flow 400 (e.g., the metadata extraction pipeline 430) may be implemented by, or as part of, the metadata-based vector pipeline 204 described with reference to FIG. 2. The processing device or system may perform the operations of the process flow 400 in sequence, in parallel, or a combination thereof. In some examples, the process flow 400 may include additional or alternative operations to those illustrated in FIG. 4. Additionally, or alternatively, the process flow 400 may include a subset of the operations illustrated in FIG. 4.

The processing device or system may receive an input document 435. The input document 435 may be an example of a complete document or a portion of a document (e.g., a chunk of a document based on a chunking procedure). At 405, the processing device or system may parse the input document 435. Parsing the input document 435 may involve one or more NLP techniques, AI-supported processing of the document text, or a combination thereof. The parsing may support identification of specific aspects of the input document 435. For example, at 410, the processing device or system may extract one or more keywords based on the document parsing. In some examples, the processing device or system may identify words or phrases as "keywords" based on sentence structure, emphasis indicators, word analysis, or other any other keyword extraction techniques. At 415, the processing device or system may extract one or more entities based on the document parsing. An entity may be an example of a data object or other named entity associated with an organization, a database, or both. For example, an entity may correspond to a specific instance of a data object stored at a database (e.g., a row in a table-based database), a specific value for a data value or record at the database (e.g., a column or cell in a table-based database), a specific tenant of a multi-tenant database system, or any combination thereof. In some cases, the processing device or system may retrieve data associated with the extracted entity from a database to increase the quantity or accuracy of information associated with the entity for vectorization. At 420, the processing device or system may summarize the input document 435 (e.g., based on the document parsing). The processing device or system may use NLP or other AI-based techniques to generate a summary of the document. At 425, the processing device or system may perform questions and answers generation. For example, the processing device or system may automatically generate potential questions and corresponding answers associated with the document using AI-techniques or stored historical data of previous questions, previous answers, or both. Additionally, or alternatively, a user (e.g., an expert user or administrator) may input potential questions relevant to the document. The processing device or system may generate one or more vectors associated with the extracted keywords, the extracted entities, the summary, the questions and answers, or any combination thereof. For example, the processing device or system may embed one or more keywords, one or more entities, one or more summaries, one or more questions, one or more answers, or any combination thereof in a vector space of a vector store 440 (e.g., a database, a portion of a database, or any other memory store).

The vector space may represent or otherwise support a knowledge base for RAG. For example, a QA system may retrieve contextual information from the vector space of the vector store 440 for an LLM as part of a RAG process. If the QA system receives a query, the QA system may vectorize the query or one or more portions of the query and may determine one or more vectors in the vector space that are relatively close to the vectorized query (e.g., within a threshold distance from the vectorized query, satisfying a threshold similarity with the vectorized query). The QA system may retrieve the keywords, entities, summaries, questions and answers, or any combination thereof corresponding to the determined one or more vectors and may augment a prompt to the LLM with the keywords, entities, summaries, questions and answers, or any combination thereof. The prompt may include this contextual information and the query to improve the accuracy and detail of the LLM's output in response to the query.

The techniques described herein may improve a QA system. For example, one or more of the techniques may improve a RAG process, an LLM's accuracy, or both for the QA system. Such improvements may reduce processing at a processing device or system hosting, or otherwise supporting, the QA system. In some examples, the described techniques may improve the QA system's holistic understanding of a knowledge based. For example, the QA system may both retrieve relevant text chunks and also capture their meaning and relationships, providing a more comprehensive understanding of the context of the text chunks. Additionally, or alternatively, the described techniques may support enhanced multi-hop retrieval of information. By leveraging knowledge graphs and LLMs, the QA system may retrieve relevant information even if it is spread across multiple documents or involves complex inferences within a document or across documents. Additionally, or alternatively, the described techniques may enable the QA system to be adaptive to diverse knowledge sources. For example, the QA system may handle various knowledge representations, including text documents, knowledge graphs, and hierarchical data structures, making the QA system more versatile and adaptable.

In some examples, the described techniques may improve information synthesis at the QA system. For example, the summarization process at each node in a hierarchical tree may enable the QA system to synthesize information across different sections of documents and across multiple documents. This may support a relatively more comprehensive understanding and generation of responses, improving the quality and relevance of the output from the QA system in response to complex queries. Additionally, or alternatively, the described techniques may support improved computational efficiency and scalability of the QA system. For example, based on the hierarchical structure and summarization process supported by the pipelines, the RAG process is more computationally efficient than simple flat text-based RAG systems. The multiple pipelines may reduce the computational load for the RAG process by focusing on the most relevant sections of the dataset for a given query, improving scalability for larger corpora without a significant increase in resource demands. In some examples, the described techniques may enhance performance for QA tasks. For example, the ensemble approach for RAG may support improved performance for various question-answering tasks compared to traditional flat text-based RAG systems. By effectively synthesizing and retrieving information from a hierarchical structure, knowledge graph, or both (e.g., in addition to from a vector space), the QA system may provide relatively more accurate and contextually relevant answers. Additionally, or alternatively, the described techniques may reduce information overlap and redundancy. By organizing information hierarchically and summarizing the information, the ensemble approach for RAG may reduce (e.g., minimize or otherwise improve) the retrieval of overlapping or redundant information. Reducing redundancies may result in cleaner, more relevant sets of information being provided in response to queries, enhancing the efficiency of the retrieval process.

Figure 5:
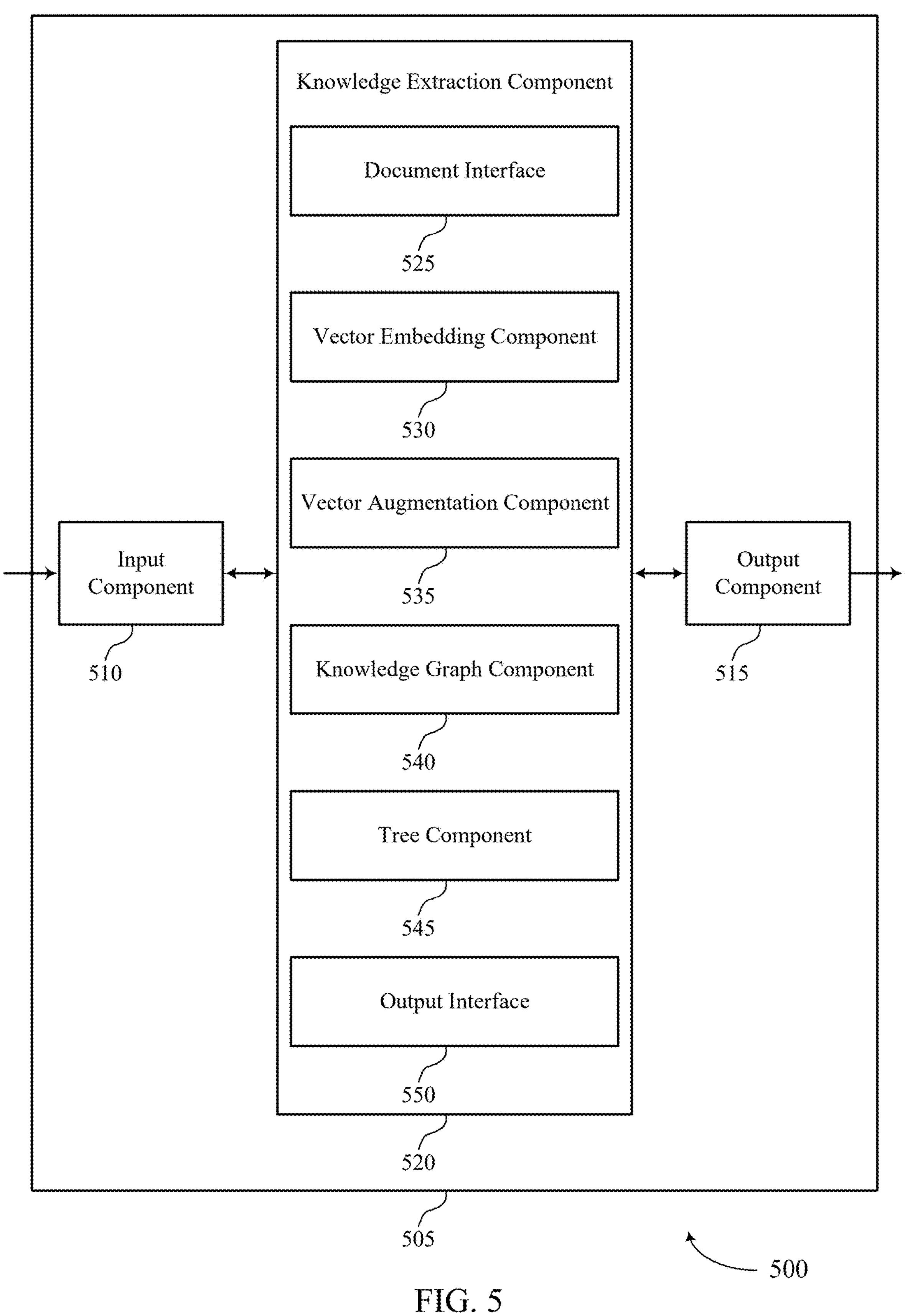
FIG. 5 shows a block diagram of an apparatus that supports ensemble augmentation with enhanced knowledge extraction techniques in accordance with aspects of the present disclosure.

FIG. 5 shows a block diagram 500 of a device 505 that supports ensemble augmentation with enhanced knowledge extraction techniques in accordance with aspects of the present disclosure. The device 505 may be a processing device or system, such as a server, a server cluster, a database server, an application server, a worker server, a cloud-based server or component, a user device, a virtual service, or any combination of these or other devices that support augmenting and processing a query using AI techniques. The device 505 may include an input component 510, an output component 515, and a knowledge extraction component 520. The device 505, or one or more components of the device 505 (e.g., the input component 510, the output component 515, the knowledge extraction component 520), may include at least one processor, which may be coupled with at least one memory, to support the described techniques. Each of these components may be in communication with one another (e.g., via one or more buses).

The input component 510 may manage input signals for the device 505. For example, the input component 510 may identify input signals based on an interaction with a modem, a keyboard, a mouse, a touchscreen, or a similar device. These input signals may be associated with user input or processing at other components or devices. In some cases, the input component 510 may utilize an operating system such as iOS®, ANDROID®, MS-DOS®, MS-WINDOWS®, OS/2®, UNIX®, LINUX®, or another known operating system to handle input signals. The input component 510 may send aspects of these input signals to other components of the device 505 for processing. For example, the input component 510 may transmit input signals to the knowledge extraction component 520 to support ensemble augmentation with enhanced knowledge extraction techniques. In some cases, the input component 510 may be a component of an input/output (I/O) controller 710 as described with reference to FIG. 7.

The output component 515 may manage output signals for the device 505. For example, the output component 515 may receive signals from other components of the device 505, such as the knowledge extraction component 520, and may transmit these signals to other components or devices. In some examples, the output component 515 may transmit output signals for display in a user interface, for storage in a database or data store, for further processing at a server or server cluster, or for any other processes at any number of devices or systems. In some cases, the output component 515 may be a component of an I/O controller 710 as described with reference to FIG. 7.

For example, the knowledge extraction component 520 may include a document interface 525, a vector embedding component 530, a vector augmentation component 535, a knowledge graph component 540, a tree component 545, an output interface 550, or any combination thereof. In some examples, the knowledge extraction component 520, or various components thereof, may be configured to perform various operations (e.g., receiving, monitoring, transmitting) using or otherwise in cooperation with the input component 510, the output component 515, or both. For example, the knowledge extraction component 520 may receive information from the input component 510, send information to the output component 515, or be integrated in combination with the input component 510, the output component 515, or both to receive information, transmit information, or perform various other operations as described herein.

The knowledge extraction component 520 may support data processing in accordance with examples as disclosed herein. The document interface 525 may be configured to support obtaining a set of multiple documents associated with a knowledge base for an information retrieval system. The vector embedding component 530 may be configured to support generating a set of vector embeddings based on the set of multiple documents. The vector augmentation component 535 may be configured to support augmenting the set of vector embeddings based on metadata associated with the set of multiple documents, the augmented set of vector embeddings including a first representation of information included in the set of multiple documents. The knowledge graph component 540 may be configured to support generating a set of knowledge graphs based on the set of multiple documents, where a knowledge graph of the set of knowledge graphs includes a respective set of multiple knowledge graph triplets, and the set of knowledge graphs includes a second representation of the information included in the set of multiple documents. The tree component 545 may be configured to support generating a set of hierarchical tree representations based on the set of multiple documents, the set of hierarchical tree representations including a third representation of the information included in the set of multiple documents. The output interface 550 may be configured to support outputting a response based on the augmented set of vector embeddings, the set of knowledge graphs, and the set of hierarchical tree representations.

Figure 6:
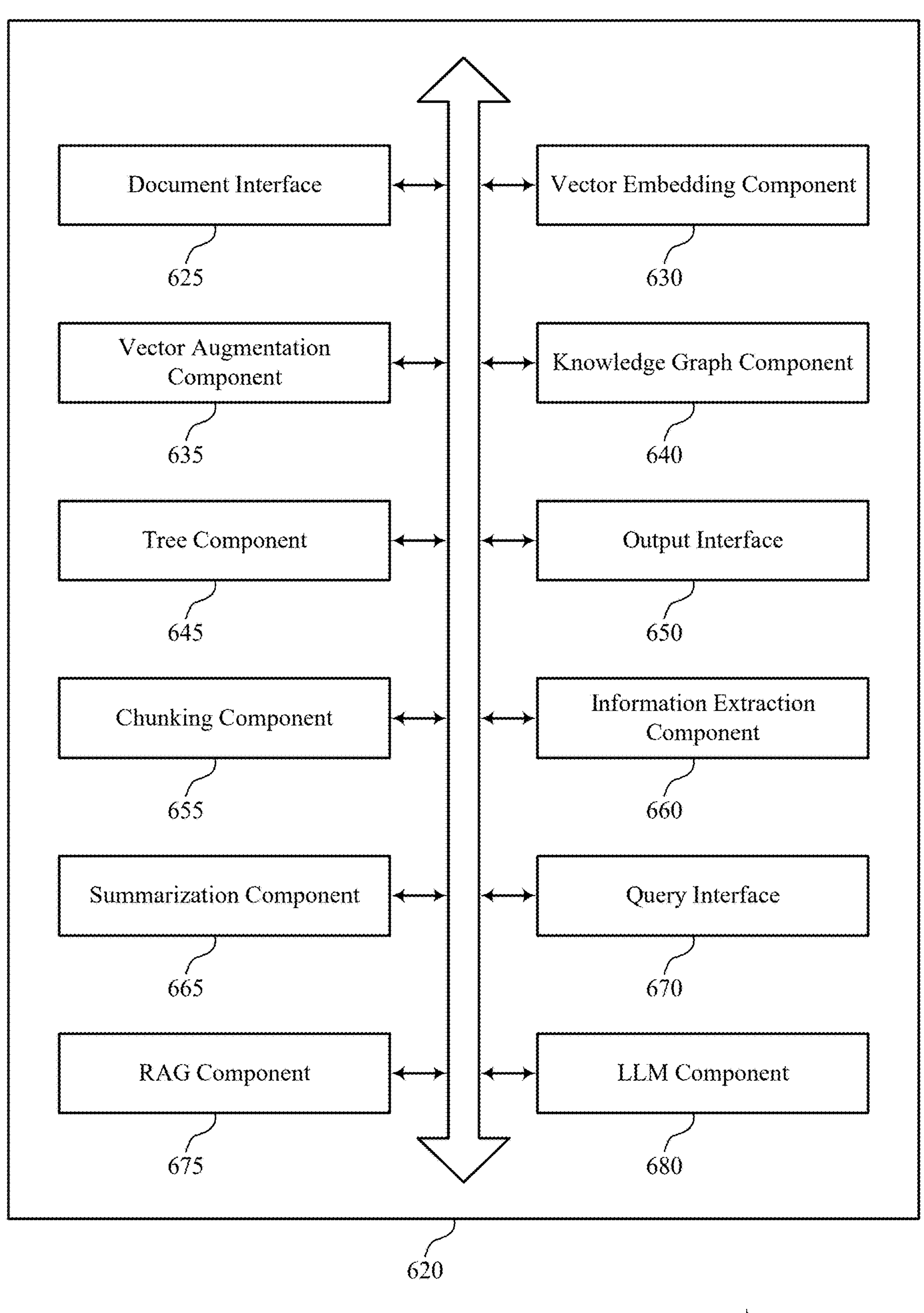
FIG. 6 shows a block diagram of a knowledge extraction component that supports ensemble augmentation with enhanced knowledge extraction techniques in accordance with aspects of the present disclosure.

FIG. 6 shows a block diagram 600 of a knowledge extraction component 620 that supports ensemble augmentation with enhanced knowledge extraction techniques in accordance with aspects of the present disclosure. The knowledge extraction component 620 may be an example of aspects of a knowledge extraction component 520 as described herein. The knowledge extraction component 620, or various components thereof, may be an example of means for performing various aspects of ensemble augmentation with enhanced knowledge extraction techniques as described herein. For example, the knowledge extraction component 620 may include a document interface 625, a vector embedding component 630, a vector augmentation component 635, a knowledge graph component 640, a tree component 645, an output interface 650, a chunking component 655, an information extraction component 660, a summarization component 665, a query interface 670, a RAG component 675, an LLM component 680, or any combination thereof. Each of these components, or components of subcomponents thereof (e.g., one or more processors, one or more memories), may communicate, directly or indirectly, with one another (e.g., via one or more buses).

The knowledge extraction component 620 may support data processing in accordance with examples as disclosed herein. The document interface 625 may be configured to support obtaining a set of multiple documents associated with a knowledge base for an information retrieval system. The vector embedding component 630 may be configured to support generating a set of vector embeddings based on the set of multiple documents. The vector augmentation component 635 may be configured to support augmenting the set of vector embeddings based on metadata associated with the set of multiple documents, the augmented set of vector embeddings including a first representation of information included in the set of multiple documents. The knowledge graph component 640 may be configured to support generating a set of knowledge graphs based on the set of multiple documents, where a knowledge graph of the set of knowledge graphs includes a respective set of multiple knowledge graph triplets, and the set of knowledge graphs includes a second representation of the information included in the set of multiple documents. The tree component 645 may be configured to support generating a set of hierarchical tree representations based on the set of multiple documents, the set of hierarchical tree representations including a third representation of the information included in the set of multiple documents. The output interface 650 may be configured to support outputting a response based on the augmented set of vector embeddings, the set of knowledge graphs, and the set of hierarchical tree representations.

In some examples, the chunking component 655 may be configured to support determining one or more respective data chunks for each document of the set of multiple documents based on one or more delimiters in the set of multiple documents, where the set of vector embeddings, the set of knowledge graphs, the set of hierarchical tree representations, or a combination thereof are generated based on the one or more respective data chunks.

In some examples, the metadata includes one or more summaries of the information included in the set of multiple documents, extracted entities from the information included in the set of multiple documents, author information for the set of multiple documents, publication date information for the set of multiple documents, respective document categories for the set of multiple documents, or a combination thereof.

In some examples, to support generating the set of knowledge graphs, the information extraction component 660 may be configured to support determining a set of multiple named entities from the set of multiple documents. In some examples, the information extraction component 660 may be configured to support determining a relationship between a first named entity and a second named entity of the set of multiple named entities based on the set of multiple documents. In some examples, the knowledge graph component 640 may be configured to support generating, for the set of knowledge graphs, a knowledge graph triplet that indicates the first named entity, the relationship, and the second named entity.

In some examples, to support generating the set of hierarchical tree representations, the summarization component 665 may be configured to support determining a summary of a portion of the set of multiple documents. In some examples, the tree component 645 may be configured to support generating a node that indicates the summary. In some examples, the tree component 645 may be configured to support inputting the node into a hierarchical tree of the set of hierarchical tree representations based on the summary, where the node is input on a branch of the hierarchical tree based on a similarity between the summary and one or more other summaries corresponding to one or more other nodes on the branch, and where the node is input at a depth of the hierarchical tree based on a level of detail of the summary.

In some examples, the query interface 670 may be configured to support obtaining a user query. In some examples, the RAG component 675 may be configured to support retrieving, from the information retrieval system and based on the user query, contextual information corresponding to: one or more vector embeddings from the augmented set of vector embeddings, one or more knowledge graph triplets from the set of knowledge graphs, and one or more nodes from the set of hierarchical tree representations. In some examples, the RAG component 675 may be configured to support augmenting the user query with the contextual information. In some examples, the LLM component 680 may be configured to support inputting the augmented user query into an LLM, where the LLM outputs the response based on the augmented user query.

In some examples, to support retrieving the contextual information, the vector embedding component 630 may be configured to support generating a vector that corresponds to the user query in a same vector space as the augmented set of vector embeddings, where the contextual information corresponding to the one or more vector embeddings is retrieved based on a vector similarity between the vector and the one or more vector embeddings satisfying a threshold.

In some examples, to support retrieving the contextual information, the information extraction component 660 may be configured to support determining one or more named entities in the user query, where the contextual information corresponding to the one or more knowledge graph triplets is retrieved based on the one or more named entities.

In some examples, to support retrieving the contextual information, the RAG component 675 may be configured to support performing a search of a hierarchical tree of the set of hierarchical tree representations, where a depth of the search is based on a detail threshold, and where the contextual information corresponding to the one or more nodes is retrieved based on the search.

In some examples, the user query is obtained from a user device, and the output interface 650 may be configured to support outputting an indication of the response to the user device.

In some examples, the set of multiple documents includes one or more websites, one or more RSS feed objects, one or more communication platform feeds, or a combination thereof. In some examples, the set of multiple documents includes public unstructured data, private unstructured data, or both.

Figure 7:
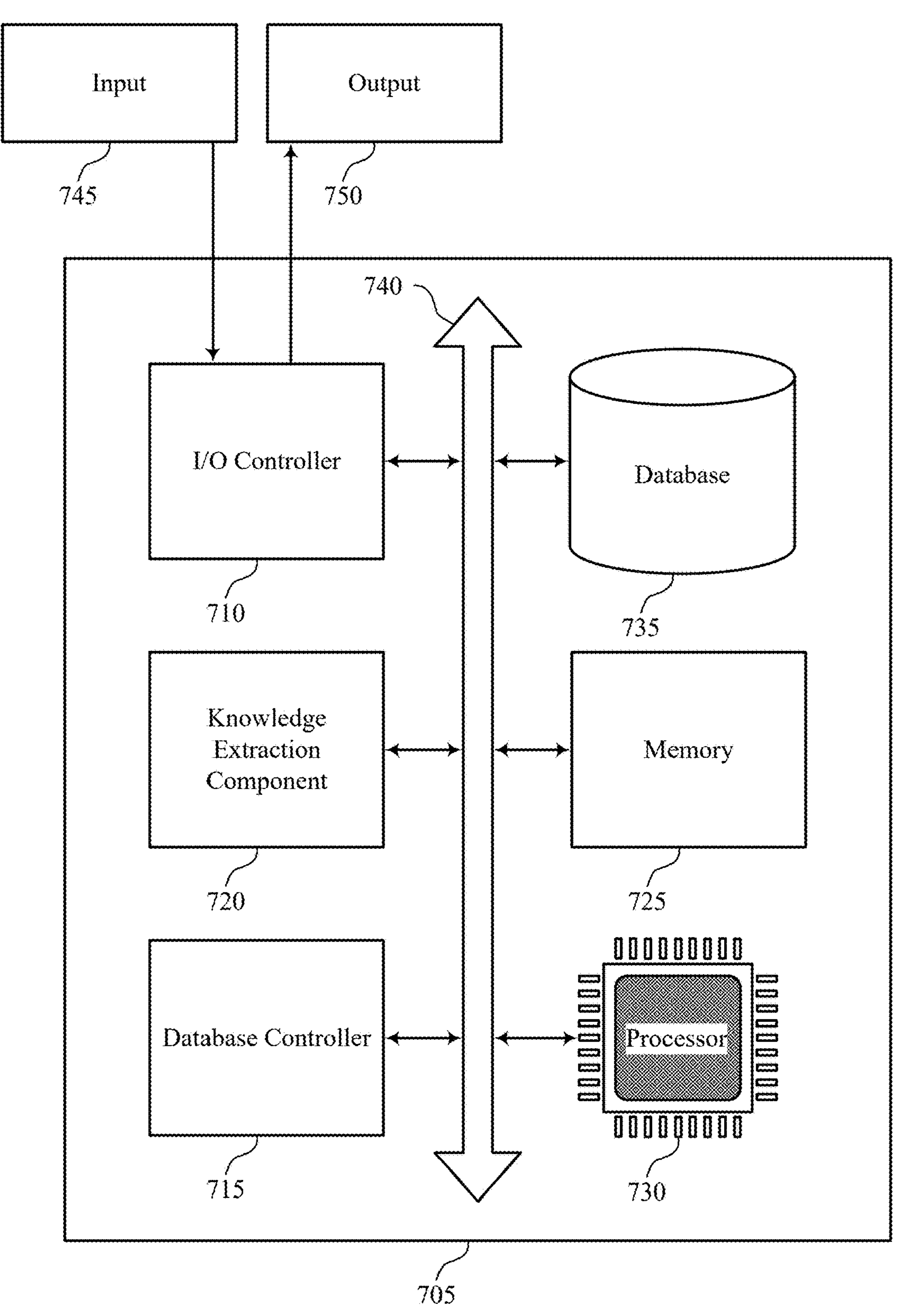
FIG. 7 shows a diagram of a system including a device that supports ensemble augmentation with enhanced knowledge extraction techniques in accordance with aspects of the present disclosure.

FIG. 7 shows a diagram of a system 700 including a device 705 that supports ensemble augmentation with enhanced knowledge extraction techniques in accordance with aspects of the present disclosure. The device 705 may be an example of or include components of a device 505 (e.g., a processing device or system) as described herein. The device 705 may include components for bi-directional data communications including components for transmitting and receiving communications, such as a knowledge extraction component 720, an I/O controller, such as an I/O controller 710, a database controller 715, at least one memory 725, at least one processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In some other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In some other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause at least one processor 730 to perform various functions described herein. In some cases, the memory 725 may contain, among other things, a basic I/O system (BIOS) which may control basic hardware or software operation such as the interaction with peripheral components or devices. The memory 725 may be an example of a single memory or multiple memories. For example, the device 705 may include one or more memories 725.

The processor 730 may include an intelligent hardware device (e.g., a general-purpose processor, a digital signal processor (DSP), a CPU, a microcontroller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In some other cases, a memory controller may be integrated into the processor 730. The processor 730 may be configured to execute computer-readable instructions stored in at least one memory 725 to perform various functions (e.g., functions or tasks supporting ensemble augmentation with enhanced knowledge extraction techniques). The processor 730 may be an example of a single processor or multiple processors. For example, the device 705 may include one or more processors 730.

The knowledge extraction component 720 may support data processing in accordance with examples as disclosed herein. For example, the knowledge extraction component 720 may be configured to support obtaining a set of multiple documents associated with a knowledge base for an information retrieval system. The knowledge extraction component 720 may be configured to support generating a set of vector embeddings based on the set of multiple documents. The knowledge extraction component 720 may be configured to support augmenting the set of vector embeddings based on metadata associated with the set of multiple documents, the augmented set of vector embeddings including a first representation of information included in the set of multiple documents. The knowledge extraction component 720 may be configured to support generating a set of knowledge graphs based on the set of multiple documents, where a knowledge graph of the set of knowledge graphs includes a respective set of multiple knowledge graph triplets, and the set of knowledge graphs includes a second representation of the information included in the set of multiple documents. The knowledge extraction component 720 may be configured to support generating a set of hierarchical tree representations based on the set of multiple documents, the set of hierarchical tree representations including a third representation of the information included in the set of multiple documents. The knowledge extraction component 720 may be configured to support outputting a response based on the augmented set of vector embeddings, the set of knowledge graphs, and the set of hierarchical tree representations.

Figure 8:
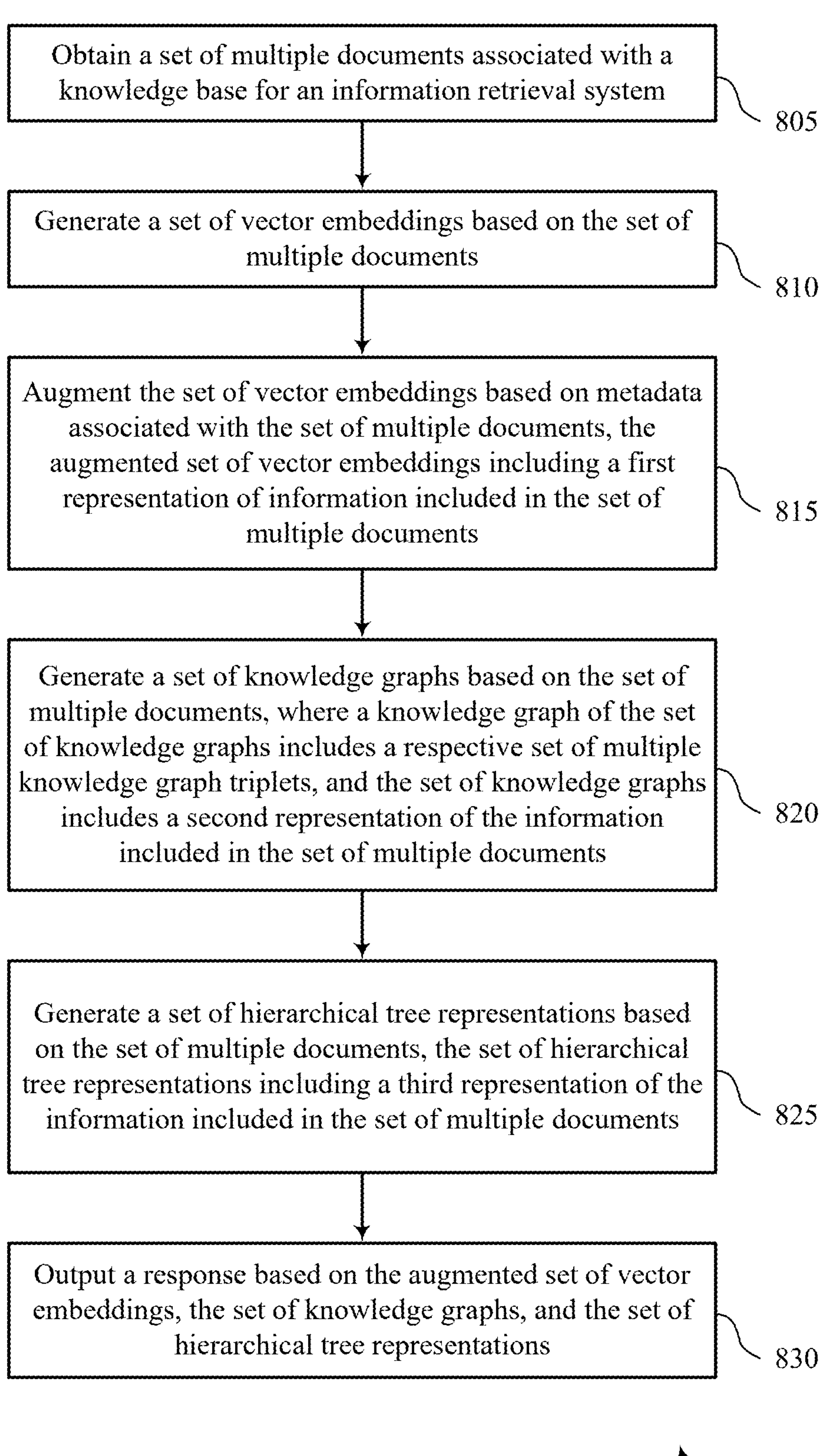
FIGS. 8 through 10 show flowcharts illustrating methods that support ensemble augmentation with enhanced knowledge extraction techniques in accordance with aspects of the present disclosure.

FIG. 8 shows a flowchart illustrating a method 800 that supports ensemble augmentation with enhanced knowledge extraction techniques in accordance with aspects of the present disclosure. The operations of the method 800 may be implemented by a processing device or system or components thereof as described herein. For example, the operations of the method 800 may be performed by a server, worker server, application server, database server, server cluster, user device, cloud-based service, container, virtual server, or any combination of these or other devices or systems that support data processing as described with reference to FIGS. 1 through 7. In some examples, a processing device or system may execute a set of instructions to control functional elements to perform the described functions. Additionally, or alternatively, the processing device or system may perform aspects of the described functions using special-purpose hardware.

At 805, the method may include obtaining a set of multiple documents associated with a knowledge base for an information retrieval system. The operations of 805 may be performed in accordance with examples as disclosed herein. In some examples, aspects of the operations of 805 may be performed by a document interface 625.

At 810, the method may include generating a set of vector embeddings based on the set of multiple documents. The operations of 810 may be performed in accordance with examples as disclosed herein. In some examples, aspects of the operations of 810 may be performed by a vector embedding component 630.

At 815, the method may include augmenting the set of vector embeddings based on metadata associated with the set of multiple documents, the augmented set of vector embeddings including a first representation of information included in the set of multiple documents. The operations of 815 may be performed in accordance with examples as disclosed herein. In some examples, aspects of the operations of 815 may be performed by a vector augmentation component 635.

At 820, the method may include generating a set of knowledge graphs based on the set of multiple documents, where a knowledge graph of the set of knowledge graphs includes a respective set of multiple knowledge graph triplets, and the set of knowledge graphs includes a second representation of the information included in the set of multiple documents. The operations of 820 may be performed in accordance with examples as disclosed herein. In some examples, aspects of the operations of 820 may be performed by a knowledge graph component 640.

At 825, the method may include generating a set of hierarchical tree representations based on the set of multiple documents, the set of hierarchical tree representations including a third representation of the information included in the set of multiple documents. The operations of 825 may be performed in accordance with examples as disclosed herein. In some examples, aspects of the operations of 825 may be performed by a tree component 645.

At 830, the method may include outputting a response based on the augmented set of vector embeddings, the set of knowledge graphs, and the set of hierarchical tree representations. The operations of 830 may be performed in accordance with examples as disclosed herein. In some examples, aspects of the operations of 830 may be performed by an output interface 650.

Figure 9:
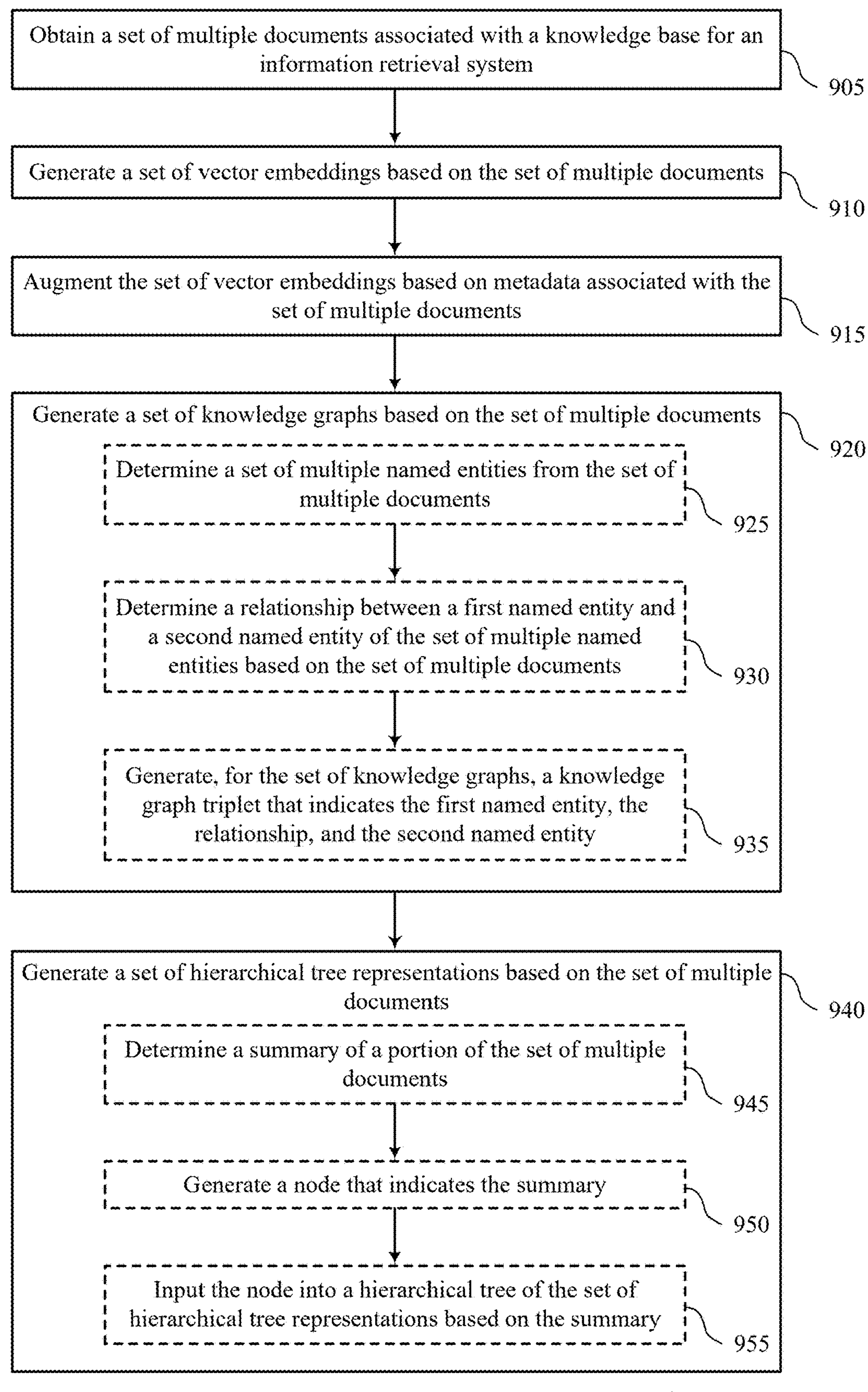

FIG. 9 shows a flowchart illustrating a method 900 that supports ensemble augmentation with enhanced knowledge extraction techniques in accordance with aspects of the present disclosure. The operations of the method 900 may be implemented by a processing device or system or components thereof as described herein. For example, the operations of the method 900 may be performed by a server, worker server, application server, database server, server cluster, user device, cloud-based service, container, virtual server, or any combination of these or other devices or systems that support data processing as described with reference to FIGS. 1 through 7. In some examples, a processing device or system may execute a set of instructions to control functional elements to perform the described functions. Additionally, or alternatively, the processing device or system may perform aspects of the described functions using special-purpose hardware.

At 905, the method may include obtaining a set of multiple documents associated with a knowledge base for an information retrieval system. The operations of 905 may be performed in accordance with examples as disclosed herein. In some examples, aspects of the operations of 905 may be performed by a document interface 625.

At 910, the method may include generating a set of vector embeddings based on the set of multiple documents. The operations of 910 may be performed in accordance with examples as disclosed herein. In some examples, aspects of the operations of 910 may be performed by a vector embedding component 630.

At 915, the method may include augmenting the set of vector embeddings based on metadata associated with the set of multiple documents. The augmented set of vector embeddings may support a first representation of information included in the set of multiple documents. The operations of 915 may be performed in accordance with examples as disclosed herein. In some examples, aspects of the operations of 915 may be performed by a vector augmentation component 635.

At 920, the method may include generating a set of knowledge graphs based on the set of multiple documents. A knowledge graph of the set of knowledge graphs includes a respective set of multiple knowledge graph triplets. The set of knowledge graphs may support a second representation of the information included in the set of multiple documents. The operations of 920 may be performed in accordance with examples as disclosed herein. In some examples, aspects of the operations of 920 may be performed by a knowledge graph component 640.

In some examples, to generate the set of knowledge graphs, at 925, the method may include determining a set of multiple named entities from the set of multiple documents. The operations of 925 may be performed in accordance with examples as disclosed herein. In some examples, aspects of the operations of 925 may be performed by an information extraction component 660. At 930, the method may include determining a relationship between a first named entity and a second named entity of the set of multiple named entities based on the set of multiple documents. The operations of 930 may be performed in accordance with examples as disclosed herein. In some examples, aspects of the operations of 930 may be performed by an information extraction component 660. At 935, the method may include generating, for the set of knowledge graphs, a knowledge graph triplet that indicates the first named entity, the relationship, and the second named entity. The operations of 935 may be performed in accordance with examples as disclosed herein. In some examples, aspects of the operations of 935 may be performed by a knowledge graph component 640.

At 940, the method may include generating a set of hierarchical tree representations based on the set of multiple documents. The set of hierarchical tree representations may support a third representation of the information included in the set of multiple documents. The operations of 940 may be performed in accordance with examples as disclosed herein. In some examples, aspects of the operations of 940 may be performed by a tree component 645.

In some examples, to generate the set of hierarchical tree representations, at 945, the method may include determining a summary of a portion of the set of multiple documents. The operations of 945 may be performed in accordance with examples as disclosed herein. In some examples, aspects of the operations of 945 may be performed by a summarization component 665. At 950, the method may include generating a node that indicates the summary. The operations of 950 may be performed in accordance with examples as disclosed herein. In some examples, aspects of the operations of 950 may be performed by a tree component 645. At 955, the method may include inputting the node into a hierarchical tree of the set of hierarchical tree representations based on the summary. The node may be input on a branch of the hierarchical tree based on a similarity between the summary and one or more other summaries corresponding to one or more other nodes on the branch. Additionally, or alternatively, the node may be input at a depth of the hierarchical tree based on a level of detail of the summary. The operations of 955 may be performed in accordance with examples as disclosed herein. In some examples, aspects of the operations of 955 may be performed by a tree component 645.

Figure 10:
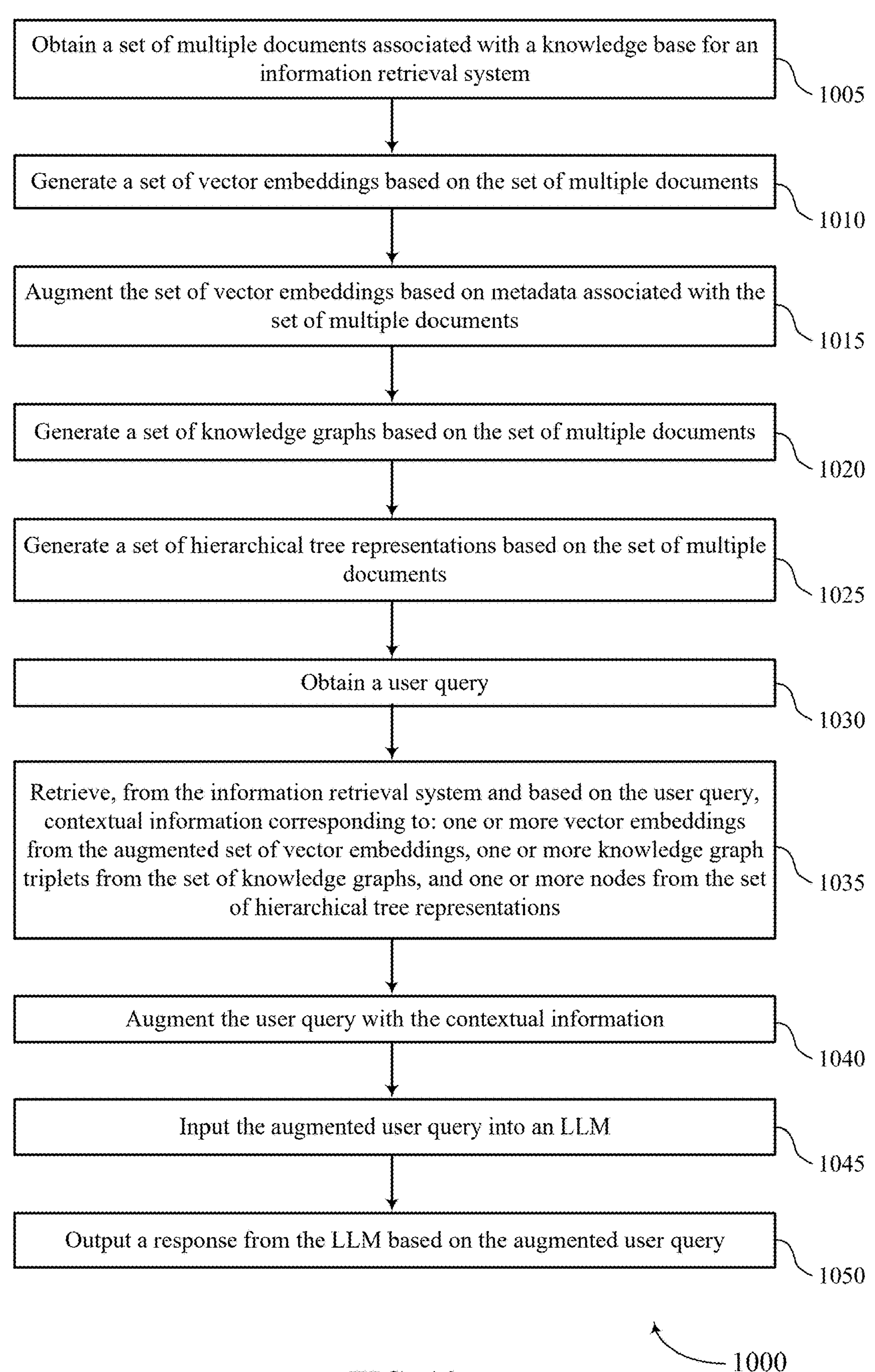

FIG. 10 shows a flowchart illustrating a method 1000 that supports ensemble augmentation with enhanced knowledge extraction techniques in accordance with aspects of the present disclosure. The operations of the method 1000 may be implemented by a processing device or system or components thereof as described herein. For example, the operations of the method 1000 may be performed by a server, worker server, application server, database server, server cluster, user device, cloud-based service, container, virtual server, or any combination of these or other devices or systems that support data processing as described with reference to FIGS. 1 through 7. In some examples, a processing device or system may execute a set of instructions to control functional elements thereof to perform the described functions. Additionally, or alternatively, the processing device or system may perform aspects of the described functions using special-purpose hardware.

At 1005, the method may include obtaining a set of multiple documents associated with a knowledge base for an information retrieval system. The operations of 1005 may be performed in accordance with examples as disclosed herein. In some examples, aspects of the operations of 1005 may be performed by a document interface 625.

At 1010, the method may include generating a set of vector embeddings based on the set of multiple documents. The operations of 1010 may be performed in accordance with examples as disclosed herein. In some examples, aspects of the operations of 1010 may be performed by a vector embedding component 630.

At 1015, the method may include augmenting the set of vector embeddings based on metadata associated with the set of multiple documents. The augmented set of vector embeddings may support a first representation of information included in the set of multiple documents. The operations of 1015 may be performed in accordance with examples as disclosed herein. In some examples, aspects of the operations of 1015 may be performed by a vector augmentation component 635.

At 1020, the method may include generating a set of knowledge graphs based on the set of multiple documents, where a knowledge graph of the set of knowledge graphs includes a respective set of multiple knowledge graph triplets. The set of knowledge graphs may support a second representation of the information included in the set of multiple documents. The operations of 1020 may be performed in accordance with examples as disclosed herein. In some examples, aspects of the operations of 1020 may be performed by a knowledge graph component 640.

At 1025, the method may include generating a set of hierarchical tree representations based on the set of multiple documents. The set of hierarchical tree representations may support a third representation of the information included in the set of multiple documents. The operations of 1025 may be performed in accordance with examples as disclosed herein. In some examples, aspects of the operations of 1025 may be performed by a tree component 645.

At 1030, the method may include obtaining a user query. The operations of 1030 may be performed in accordance with examples as disclosed herein. In some examples, aspects of the operations of 1030 may be performed by a query interface 670.

At 1035, the method may include retrieving, from the information retrieval system and based on the user query, contextual information corresponding to: one or more vector embeddings from the augmented set of vector embeddings, one or more knowledge graph triplets from the set of knowledge graphs, and one or more nodes from the set of hierarchical tree representations. The operations of 1035 may be performed in accordance with examples as disclosed herein. In some examples, aspects of the operations of 1035 may be performed by a RAG component 675.

At 1040, the method may include augmenting the user query with the contextual information. The operations of 1040 may be performed in accordance with examples as disclosed herein. In some examples, aspects of the operations of 1040 may be performed by a RAG component 675.

At 1045, the method may include inputting the augmented user query into an LLM. The operations of 1045 may be performed in accordance with examples as disclosed herein. In some examples, aspects of the operations of 1045 may be performed by an LLM component 680.

At 1050, the method may include outputting a response, from the LLM, based on the augmented user query. The operations of 1050 may be performed in accordance with examples as disclosed herein. In some examples, aspects of the operations of 1050 may be performed by an output interface 650.

A method for data processing is described. The method may include obtaining a set of multiple documents associated with a knowledge base for an information retrieval system, generating a set of vector embeddings based on the set of multiple documents, augmenting the set of vector embeddings based on metadata associated with the set of multiple documents, the augmented set of vector embeddings including a first representation of information included in the set of multiple documents, generating a set of knowledge graphs based on the set of multiple documents, where a knowledge graph of the set of knowledge graphs includes a respective set of multiple knowledge graph triplets, and the set of knowledge graphs includes a second representation of the information included in the set of multiple documents, generating a set of hierarchical tree representations based on the set of multiple documents, the set of hierarchical tree representations including a third representation of the information included in the set of multiple documents, and outputting a response based on the augmented set of vector embeddings, the set of knowledge graphs, and the set of hierarchical tree representations.

An apparatus for data processing is described. The apparatus may include one or more memories storing processor executable code and one or more processors coupled with the one or more memories. The one or more processors may individually or collectively be operable to execute the code to cause the apparatus to obtain a set of multiple documents associated with a knowledge base for an information retrieval system, generate a set of vector embeddings based on the set of multiple documents, augment the set of vector embeddings based on metadata associated with the set of multiple documents, the augmented set of vector embeddings including a first representation of information included in the set of multiple documents, generate a set of knowledge graphs based on the set of multiple documents, where a knowledge graph of the set of knowledge graphs includes a respective set of multiple knowledge graph triplets, and the set of knowledge graphs includes a second representation of the information included in the set of multiple documents, generate a set of hierarchical tree representations based on the set of multiple documents, the set of hierarchical tree representations including a third representation of the information included in the set of multiple documents, and output a response based on the augmented set of vector embeddings, the set of knowledge graphs, and the set of hierarchical tree representations.

Another apparatus for data processing is described. The apparatus may include means for obtaining a set of multiple documents associated with a knowledge base for an information retrieval system, means for generating a set of vector embeddings based on the set of multiple documents, means for augmenting the set of vector embeddings based on metadata associated with the set of multiple documents, the augmented set of vector embeddings including a first representation of information included in the set of multiple documents, means for generating a set of knowledge graphs based on the set of multiple documents, where a knowledge graph of the set of knowledge graphs includes a respective set of multiple knowledge graph triplets, and the set of knowledge graphs includes a second representation of the information included in the set of multiple documents, means for generating a set of hierarchical tree representations based on the set of multiple documents, the set of hierarchical tree representations including a third representation of the information included in the set of multiple documents, and means for outputting a response based on the augmented set of vector embeddings, the set of knowledge graphs, and the set of hierarchical tree representations.

A non-transitory computer-readable medium storing code for data processing is described. The code may include instructions executable by one or more processors to obtain a set of multiple documents associated with a knowledge base for an information retrieval system, generate a set of vector embeddings based on the set of multiple documents, augment the set of vector embeddings based on metadata associated with the set of multiple documents, the augmented set of vector embeddings including a first representation of information included in the set of multiple documents, generate a set of knowledge graphs based on the set of multiple documents, where a knowledge graph of the set of knowledge graphs includes a respective set of multiple knowledge graph triplets, and the set of knowledge graphs includes a second representation of the information included in the set of multiple documents, generate a set of hierarchical tree representations based on the set of multiple documents, the set of hierarchical tree representations including a third representation of the information included in the set of multiple documents, and output a response based on the augmented set of vector embeddings, the set of knowledge graphs, and the set of hierarchical tree representations.

Some examples of the method, apparatuses, and non-transitory computer-readable medium described herein may further include operations, features, means, or instructions for determining one or more respective data chunks for each document of the set of multiple documents based on one or more delimiters in the set of multiple documents, where the set of vector embeddings, the set of knowledge graphs, the set of hierarchical tree representations, or a combination thereof may be generated based on the one or more respective data chunks.

In some examples of the method, apparatuses, and non-transitory computer-readable medium described herein, the metadata includes one or more summaries of the information included in the set of multiple documents, extracted entities from the information included in the set of multiple documents, author information for the set of multiple documents, publication date information for the set of multiple documents, respective document categories for the set of multiple documents, or a combination thereof.

In some examples of the method, apparatuses, and non-transitory computer-readable medium described herein, generating the set of knowledge graphs may include operations, features, means, or instructions for determining a set of multiple named entities from the set of multiple documents, determining a relationship between a first named entity and a second named entity of the set of multiple named entities based on the set of multiple documents, and generating, for the set of knowledge graphs, a knowledge graph triplet that indicates the first named entity, the relationship, and the second named entity.

In some examples of the method, apparatuses, and non-transitory computer-readable medium described herein, generating the set of hierarchical tree representations may include operations, features, means, or instructions for determining a summary of a portion of the set of multiple documents, generating a node that indicates the summary, and inputting the node into a hierarchical tree of the set of hierarchical tree representations based on the summary, where the node may be input on a branch of the hierarchical tree based on a similarity between the summary and one or more other summaries corresponding to one or more other nodes on the branch, and where the node may be input at a depth of the hierarchical tree based on a level of detail of the summary.

Some examples of the method, apparatuses, and non-transitory computer-readable medium described herein may further include operations, features, means, or instructions for obtaining a user query, retrieving, from the information retrieval system and based on the user query, contextual information corresponding to: one or more vector embeddings from the augmented set of vector embeddings, one or more knowledge graph triplets from the set of knowledge graphs, and one or more nodes from the set of hierarchical tree representations, augmenting the user query with the contextual information, and inputting the augmented user query into an LLM, where the LLM outputs the response based on the augmented user query.

In some examples of the method, apparatuses, and non-transitory computer-readable medium described herein, retrieving the contextual information may include operations, features, means, or instructions for generating a vector that corresponds to the user query in a same vector space as the augmented set of vector embeddings, where the contextual information corresponding to the one or more vector embeddings may be retrieved based on a vector similarity between the vector and the one or more vector embeddings satisfying a threshold.

In some examples of the method, apparatuses, and non-transitory computer-readable medium described herein, retrieving the contextual information may include operations, features, means, or instructions for determining one or more named entities in the user query, where the contextual information corresponding to the one or more knowledge graph triplets may be retrieved based on the one or more named entities.

In some examples of the method, apparatuses, and non-transitory computer-readable medium described herein, retrieving the contextual information may include operations, features, means, or instructions for performing a search of a hierarchical tree of the set of hierarchical tree representations, where a depth of the search may be based on a detail threshold, and where the contextual information corresponding to the one or more nodes may be retrieved based on the search.

In some examples of the method, apparatuses, and non-transitory computer-readable medium described herein, the user query may be obtained from a user device and the method, apparatuses, and non-transitory computer-readable medium may include further operations, features, means, or instructions for outputting an indication of the response to the user device.

In some examples of the method, apparatuses, and non-transitory computer-readable medium described herein, the set of multiple documents includes one or more websites, one or more RSS feed objects, one or more communication platform feeds, or a combination thereof.

In some examples of the method, apparatuses, and non-transitory computer-readable medium described herein, the set of multiple documents includes public unstructured data, private unstructured data, or both.

Additionally, a RAG system is described. The RAG system may include a retrieval component configured to: retrieve knowledge nodes, chunks, and triplets from an external knowledge source, extract embedding vectors from the retrieved knowledge nodes, chunks, and triplets, and enhance the embedding vectors with metadata associated with the knowledge nodes, chunks, and triplets. The RAG system may further include a knowledge graph interface component configured to interact with an external knowledge graph to extract entity-specific information. The RAG system may further include a recursive hierarchical tree component configured to: receive the retrieved knowledge nodes, chunks, and triplets and construct a hierarchical tree representation of the knowledge nodes, chunks, and triplets. The RAG system may further include a generation component configured to receive the enhanced embedding vectors, the entity-specific information, and the hierarchical tree representation and generate an output based on the received information.

In some examples of the RAG system, the metadata includes: summaries of the retrieved knowledge chunks; extracted entities from the retrieved knowledge nodes, chunks, and triplets; additional data associated with the knowledge nodes, chunks, and triplets, such as author information, a publication date, a document category; or any combination thereof.

In some examples of the RAG system, the knowledge graph interface component may utilize an LLM to extract the entity-specific information.

In some examples of the RAG system, the recursive hierarchical tree component may employ recursive embedding to represent the relationships between knowledge nodes, chunks, and triplets at different levels of the tree, utilize clustering techniques to group similar knowledge nodes, chunks, and triplets within the tree, and perform summarization at different levels of the tree to capture varying degrees of detail for broader and narrower concepts.

The following provides an overview of aspects of the present disclosure:

Aspect 1: A method for data processing, comprising: obtaining a plurality of documents associated with a knowledge base for an information retrieval system; generating a set of vector embeddings based at least in part on the plurality of documents; augmenting the set of vector embeddings based at least in part on metadata associated with the plurality of documents, the augmented set of vector embeddings comprising a first representation of information included in the plurality of documents; generating a set of knowledge graphs based at least in part on the plurality of documents, wherein a knowledge graph of the set of knowledge graphs comprises a respective plurality of knowledge graph triplets, and the set of knowledge graphs comprises a second representation of the information included in the plurality of documents; generating a set of hierarchical tree representations based at least in part on the plurality of documents, the set of hierarchical tree representations comprising a third representation of the information included in the plurality of documents; and outputting a response based at least in part on the augmented set of vector embeddings, the set of knowledge graphs, and the set of hierarchical tree representations.

Aspect 2: The method of aspect 1, further comprising: determining one or more respective data chunks for each document of the plurality of documents based at least in part on one or more delimiters in the plurality of documents, wherein the set of vector embeddings, the set of knowledge graphs, the set of hierarchical tree representations, or a combination thereof are generated based at least in part on the one or more respective data chunks.

Aspect 3: The method of either of aspects 1 or 2, wherein the metadata comprises one or more summaries of the information included in the plurality of documents, extracted entities from the information included in the plurality of documents, author information for the plurality of documents, publication date information for the plurality of documents, respective document categories for the plurality of documents, or a combination thereof.

Aspect 4: The method of any of aspects 1 through 3, wherein generating the set of knowledge graphs comprises: determining a plurality of named entities from the plurality of documents; determining a relationship between a first named entity and a second named entity of the plurality of named entities based at least in part on the plurality of documents; and generating, for the set of knowledge graphs, a knowledge graph triplet that indicates the first named entity, the relationship, and the second named entity.

Aspect 5: The method of any of aspects 1 through 4, wherein generating the set of hierarchical tree representations comprises: determining a summary of a portion of the plurality of documents; generating a node that indicates the summary; and inputting the node into a hierarchical tree of the set of hierarchical tree representations based at least in part on the summary, wherein the node is input on a branch of the hierarchical tree based at least in part on a similarity between the summary and one or more other summaries corresponding to one or more other nodes on the branch, and wherein the node is input at a depth of the hierarchical tree based at least in part on a level of detail of the summary.

Aspect 6: The method of any of aspects 1 through 5, further comprising: obtaining a user query; retrieving, from the information retrieval system and based at least in part on the user query, contextual information corresponding to: one or more vector embeddings from the augmented set of vector embeddings, one or more knowledge graph triplets from the set of knowledge graphs, and one or more nodes from the set of hierarchical tree representations; augmenting the user query with the contextual information; and inputting the augmented user query into an LLM, wherein the LLM outputs the response based at least in part on the augmented user query.

Aspect 7: The method of aspect 6, wherein retrieving the contextual information comprises: generating a vector that corresponds to the user query in a same vector space as the augmented set of vector embeddings, wherein the contextual information corresponding to the one or more vector embeddings is retrieved based at least in part on a vector similarity between the vector and the one or more vector embeddings satisfying a threshold.

Aspect 8: The method of either of aspects 6 or 7, wherein retrieving the contextual information comprises: determining one or more named entities in the user query, wherein the contextual information corresponding to the one or more knowledge graph triplets is retrieved based at least in part on the one or more named entities.

Aspect 9: The method of any of aspects 6 through 8, wherein retrieving the contextual information comprises: performing a search of a hierarchical tree of the set of hierarchical tree representations, wherein a depth of the search is based at least in part on a detail threshold, and wherein the contextual information corresponding to the one or more nodes is retrieved based at least in part on the search.

Aspect 10: The method of any of aspects 6 through 9, wherein the user query is obtained from a user device, the method further comprising: outputting an indication of the response to the user device.

Aspect 11: The method of any of aspects 1 through 10, wherein the plurality of documents comprises one or more websites, one or more RSS feed objects, one or more communication platform feeds, or a combination thereof.

Aspect 12: The method of any of aspects 1 through 11, wherein the plurality of documents comprises public unstructured data, private unstructured data, or both.

Aspect 13: An apparatus for data processing, comprising one or more memories storing processor-executable code and one or more processors coupled with the one or more memories and individually or collectively operable to execute the code to cause the apparatus to perform a method of any of aspects 1 through 12.

Aspect 14: An apparatus for data processing, comprising at least one means for performing a method of any of aspects 1 through 12.

Aspect 15: A non-transitory computer-readable medium storing code for data processing, the code comprising instructions executable by one or more processors to perform a method of any of aspects 1 through 12.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data processing, comprising:

obtaining a plurality of documents associated with a knowledge base for an information retrieval system;

generating a set of vector embeddings based at least in part on the plurality of documents;

augmenting the set of vector embeddings based at least in part on metadata associated with the plurality of documents, the augmented set of vector embeddings comprising a first representation of information included in the plurality of documents;

generating a set of knowledge graphs based at least in part on the plurality of documents, wherein a knowledge graph of the set of knowledge graphs comprises a respective plurality of knowledge graph triplets, and the set of knowledge graphs comprises a second representation of the information included in the plurality of documents;

generating a set of hierarchical tree representations based at least in part on the plurality of documents, the set of hierarchical tree representations comprising a third representation of the information included in the plurality of documents; and outputting a response based at least in part on the augmented set of vector embeddings, the set of knowledge graphs, and the set of hierarchical tree representations.

2. The method of claim 1, further comprising:

determining one or more respective data chunks for each document of the plurality of documents based at least in part on one or more delimiters in the plurality of documents, wherein the set of vector embeddings, the set of knowledge graphs, the set of hierarchical tree representations, or a combination thereof are generated based at least in part on the one or more respective data chunks.

3. The method of claim 1, wherein the metadata comprises one or more summaries of the information included in the plurality of documents, extracted entities from the information included in the plurality of documents, author information for the plurality of documents, publication date information for the plurality of documents, respective document categories for the plurality of documents, or a combination thereof.

4. The method of claim 1, wherein generating the set of knowledge graphs comprises:

determining a plurality of named entities from the plurality of documents;

determining a relationship between a first named entity and a second named entity of the plurality of named entities based at least in part on the plurality of documents; and generating, for the set of knowledge graphs, a knowledge graph triplet that indicates the first named entity, the relationship, and the second named entity.

5. The method of claim 1, wherein generating the set of hierarchical tree representations comprises:

determining a summary of a portion of the plurality of documents;

generating a node that indicates the summary; and inputting the node into a hierarchical tree of the set of hierarchical tree representations based at least in part on the summary, wherein the node is input on a branch of the hierarchical tree based at least in part on a similarity between the summary and one or more other summaries corresponding to one or more other nodes on the branch, and wherein the node is input at a depth of the hierarchical tree based at least in part on a level of detail of the summary.

6. The method of claim 1, further comprising:

obtaining a user query;

retrieving, from the information retrieval system and based at least in part on the user query, contextual information corresponding to:

one or more vector embeddings from the augmented set of vector embeddings, one or more knowledge graph triplets from the set of knowledge graphs, and one or more nodes from the set of hierarchical tree representations;

augmenting the user query with the contextual information; and inputting the augmented user query into a large language model (LLM), wherein the LLM outputs the response based at least in part on the augmented user query.

7. The method of claim 6, wherein retrieving the contextual information comprises:

generating a vector that corresponds to the user query in a same vector space as the augmented set of vector embeddings, wherein the contextual information corresponding to the one or more vector embeddings is retrieved based at least in part on a vector similarity between the vector and the one or more vector embeddings satisfying a threshold.

8. The method of claim 6, wherein retrieving the contextual information comprises:

determining one or more named entities in the user query, wherein the contextual information corresponding to the one or more knowledge graph triplets is retrieved based at least in part on the one or more named entities.

9. The method of claim 6, wherein retrieving the contextual information comprises:

performing a search of a hierarchical tree of the set of hierarchical tree representations, wherein a depth of the search is based at least in part on a detail threshold, and wherein the contextual information corresponding to the one or more nodes is retrieved based at least in part on the search.

10. The method of claim 6, wherein the user query is obtained from a user device, the method further comprising:

outputting an indication of the response to the user device.

11. The method of claim 1, wherein the plurality of documents comprises one or more websites, one or more Really Simple Syndication (RSS) feed objects, one or more communication platform feeds, or a combination thereof.

12. The method of claim 1, wherein the plurality of documents comprises public unstructured data, private unstructured data, or both.

13. An apparatus for data processing, comprising:

one or more memories comprising random-access memory, read-only memory, or both, and storing processor-executable code; and one or more processors coupled with the one or more memories and individually or collectively operable to execute the code to cause the apparatus to:

obtain a plurality of documents associated with a knowledge base for an information retrieval system;

generate a set of vector embeddings based at least in part on the plurality of documents;

augment the set of vector embeddings based at least in part on metadata associated with the plurality of documents, the augmented set of vector embeddings comprising a first representation of information included in the plurality of documents;

generate a set of knowledge graphs based at least in part on the plurality of documents, wherein a knowledge graph of the set of knowledge graphs comprises a respective plurality of knowledge graph triplets, and the set of knowledge graphs comprises a second representation of the information included in the plurality of documents;

generate a set of hierarchical tree representations based at least in part on the plurality of documents, the set of hierarchical tree representations comprising a third representation of the information included in the plurality of documents; and output a response based at least in part on the augmented set of vector embeddings, the set of knowledge graphs, and the set of hierarchical tree representations.

14. The apparatus of claim 13, wherein the one or more processors are individually or collectively further operable to execute the code to cause the apparatus to:

determine one or more respective data chunks for each document of the plurality of documents based at least in part on one or more delimiters in the plurality of documents, wherein the set of vector embeddings, the set of knowledge graphs, the set of hierarchical tree representations, or a combination thereof are generated based at least in part on the one or more respective data chunks.

15. The apparatus of claim 13, wherein the metadata comprises one or more summaries of the information included in the plurality of documents, extracted entities from the information included in the plurality of documents, author information for the plurality of documents, publication date information for the plurality of documents, respective document categories for the plurality of documents, or a combination thereof.

16. The apparatus of claim 13, wherein, to generate the set of knowledge graphs, the one or more processors are individually or collectively operable to execute the code to cause the apparatus to:

determine a plurality of named entities from the plurality of documents;

determine a relationship between a first named entity and a second named entity of the plurality of named entities based at least in part on the plurality of documents; and generate, for the set of knowledge graphs, a knowledge graph triplet that indicates the first named entity, the relationship, and the second named entity.

17. The apparatus of claim 13, wherein, to generate the set of hierarchical tree representations, the one or more processors are individually or collectively operable to execute the code to cause the apparatus to:

determine a summary of a portion of the plurality of documents;

generate a node that indicates the summary; and input the node into a hierarchical tree of the set of hierarchical tree representations based at least in part on the summary, wherein the node is input on a branch of the hierarchical tree based at least in part on a similarity between the summary and one or more other summaries corresponding to one or more other nodes on the branch, and wherein the node is input at a depth of the hierarchical tree based at least in part on a level of detail of the summary.

18. The apparatus of claim 13, wherein the one or more processors are individually or collectively further operable to execute the code to cause the apparatus to:

obtain a user query;

retrieve, from the information retrieval system and based at least in part on the user query, contextual information corresponding to:

one or more vector embeddings from the augmented set of vector embeddings, one or more knowledge graph triplets from the set of knowledge graphs, and one or more nodes from the set of hierarchical tree representations;

augment the user query with the contextual information; and input the augmented user query into a large language model (LLM), wherein the LLM outputs the response based at least in part on the augmented user query.

19. The apparatus of claim 13, wherein the plurality of documents comprises public unstructured data, private unstructured data, or both.

20. A non-transitory computer-readable medium storing code for data processing, the code comprising instructions executable by one or more processors to:

obtain a plurality of documents associated with a knowledge base for an information retrieval system;

generate a set of vector embeddings based at least in part on the plurality of documents;

augment the set of vector embeddings based at least in part on metadata associated with the plurality of documents, the augmented set of vector embeddings comprising a first representation of information included in the plurality of documents;

generate a set of knowledge graphs based at least in part on the plurality of documents, wherein a knowledge graph of the set of knowledge graphs comprises a respective plurality of knowledge graph triplets, and the set of knowledge graphs comprises a second representation of the information included in the plurality of documents;

generate a set of hierarchical tree representations based at least in part on the plurality of documents, the set of hierarchical tree representations comprising a third representation of the information included in the plurality of documents; and output a response based at least in part on the augmented set of vector embeddings, the set of knowledge graphs, and the set of hierarchical tree representations.

* * * * *